(12) United States Patent
Piya et al.

(10) Patent No.: US 10,579,207 B2
(45) Date of Patent: Mar. 3, 2020

(54) MANIPULATING VIRTUAL ENVIRONMENT USING NON-INSTRUMENTED PHYSICAL OBJECT

(71) Applicant: Purdue Research Foundation, West Lafayette, IN (US)

(72) Inventors: Cecil Piya, West Lafayette, IN (US); Vinayak Raman Krishnamurthy, West Lafayette, IN (US); Karthik Ramani, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 489 days.

(21) Appl. No.: 14/712,695

(22) Filed: May 14, 2015

(65) Prior Publication Data

US 2015/0331576 A1 Nov. 19, 2015

Related U.S. Application Data

(60) Provisional application No. 61/992,888, filed on May 14, 2014.

(51) Int. Cl.
*G06F 3/0481* (2013.01)
*G06F 3/01* (2006.01)

(52) U.S. Cl.
CPC .......... *G06F 3/04815* (2013.01); *G06F 3/011* (2013.01)

(58) Field of Classification Search
CPC ............................. G06F 3/04815; G06F 3/011
See application file for complete search history.

(56) References Cited

U.S. PATENT DOCUMENTS

| 6,831,640 | B2 | 12/2004 | Shih et al. | |
|---|---|---|---|---|
| 7,289,121 | B1 | 10/2007 | Balakrishnan et al. | |
| 7,519,223 | B2 * | 4/2009 | Dehlin | G06F 3/0354 345/173 |
| 7,535,463 | B2 * | 5/2009 | Wilson | G06T 7/269 345/175 |
| 7,839,417 | B2 | 11/2010 | Ebensberger et al. | |
| 8,072,470 | B2 * | 12/2011 | Marks | A63F 13/10 345/473 |

(Continued)

OTHER PUBLICATIONS

Angelidis et al. "Swirling-Sweepers: Constant-Volume Modeling", Pacific Graphics, p. 10-15.*

(Continued)

*Primary Examiner* — Ryan R Yang
(74) *Attorney, Agent, or Firm* — Lee & Hayes, P.C.

(57) ABSTRACT

A method of manipulating a three-dimensional image file including a virtual object includes obtaining image information in a processing device of a non-instrumented physical object manipulated by a user, such image information including movement information; and causing virtual movement of the virtual object based on the movement information. A method of shaping a virtual object includes obtaining image information including movement information; and determining a shape of the virtual object based on the movement information. A method of modifying a virtual object includes obtaining image information including movement information; and altering a virtual surface appearance of at least a part of the virtual object based on the movement information. Systems and computer-readable media are also described.

20 Claims, 20 Drawing Sheets

(56) References Cited

U.S. PATENT DOCUMENTS

| | | | | |
|---|---|---|---|---|
| 8,823,639 | B2* | 9/2014 | Jackson | G06F 3/011 |
| | | | | 345/156 |
| 9,245,177 | B2* | 1/2016 | Perez | G06K 9/00355 |
| 2004/0233223 | A1 | 11/2004 | Schkolne et al. | |
| 2006/0284874 | A1* | 12/2006 | Wilson | G06F 3/0421 |
| | | | | 345/473 |
| 2011/0298827 | A1* | 12/2011 | Perez | G06K 9/00355 |
| | | | | 345/647 |
| 2012/0130521 | A1* | 5/2012 | Kohlhoff | G06T 19/00 |
| | | | | 700/98 |

OTHER PUBLICATIONS

Arisandi et al., "Virtual Handcrafting: Building Virtual Wood Models Using ToolDevice", in the Proceedings of the IEEE, vol. 102, No. 2, Feb. 2014, 11 pages.

Foskey et al., "ArtNova: Touch-Enabled 3D Model Design", in the Proceedings of the 2002 IEEE Virtual Reality, 2002, 8 pages.

Held et al., "3D Puppetry: A Kinect-based Interface for 3D Animation", in the Proceedings of the 25th Annual ACM Symposium on User Interface Software and Technology, Oct. 7, 2012, 11 pages.

Lau et al., "Situated Modeling: A Shape Stamping Interface with Tangible Primitives", in the Proceedings of the Sixth International Conference on Tangible, Embedded and Embodied Interaction, Feb. 19, 2012, 8 pages.

Sheng et al., "An Interface for Virtual 3D Sculpting via Physical Proxy", in the Proceedings of the 4th International Conference on Computer Graphics and Interactive Techniques in Australasia and Southeast Asia, Nov. 29, 2006, 8 pages.

Weichel et al., "SPATA: Spatio-Tangible Tools for Fabrication-Aware Design", in the Proceedings of the Ninth International Conference on Tangible, Embedded, and Embodied Interaction, Jan. 15, 2015, 8 pages.

"Conference History", Feb. 14, 2016. Retrieved Sep. 5, 2017 from <<http://tei.acm.org/2016/aboutTEI.html>>, 4 pages.

"Phantom", SensAble Technologies, Oct. 6, 2001. Retrieved Sep. 1, 2017 from https://web.archive.org/web/20011006085203/http://www.sensable.com:80/haptics/products/phantom.html.

"Products: 6DOF", SensAble Technologies, Oct. 6, 2001. Retrieved Oct. 30, 2017 from <https://web.archive.org/web/20011006120425/http://www.sensable.com:80/haptics/products/6dof.html> 2 pages.

\* cited by examiner

MANIPULATING VIRTUAL ENVIRONMENT USING NON-INSTRUMENTED PHYSICAL OBJECT

CROSS-REFERENCE TO RELATED APPLICATIONS

This application is a nonprovisional application of, and claims priority to and the benefit of, U.S. Provisional Patent Application Ser. No. 61/992,888, filed May 14, 2014 and entitled "TAICHI: Tangible Assisted Interfaces for Computer-Human Interactions," the entirety of which is incorporated herein by reference.

STATEMENT OF FEDERALLY SPONSORED RESEARCH OR DEVELOPMENT

This invention was made with Government support under Contract No. CMMI1235232 awarded by the National Science Foundation. The government has certain rights in the invention.

TECHNICAL FIELD

The present application relates to human-computer interaction, and, more particularly, to such interaction in a three-dimensional (3-D) environment.

BACKGROUND

Conventional graphical human-computer interfaces are referred to as "WIMP" interfaces, for the Windows, Icons, Menus, and mouse Pointers they provide and employ. Traditional WIMP based modalities, when applied to interactions in virtual 3-D environments, are completely oblivious to users' spatial interaction capabilities and the affordances of physical objects in the surrounding environment. Instead they rely on minimalistic user motions to accomplish large scale 3-D interactive tasks. As a result, a large part of the input effort users apply while performing 3-D tasks are based on their cognitive perceptions and processes. In addition, the lack of expressiveness in these modalities requires the presence of an extensive set of non-intuitive control widgets (e.g., buttons, icons, menus etc.) for providing spatial inputs. Such mechanisms make shape modeling tasks difficult to learn and apply.

BRIEF DESCRIPTION

According to an aspect, there is provided a method of manipulating a three-dimensional image file including a virtual object, comprising: obtaining image information in a processing device of a non-instrumented physical object manipulated by a user, such image information including movement information; and causing virtual movement of the virtual object based on the movement information.

According to another aspect, there is provided a method of shaping a virtual object in a three-dimensional image file, comprising: obtaining image information in a processing device of a non-instrumented physical object manipulated by a user, such image information including movement information; and determining a shape of the virtual object based on the movement information.

According to another aspect, there is provided a method of modifying a virtual object in a three-dimensional image file, comprising: obtaining image information in a processing device of a non-instrumented physical object manipulated by a user, such image information including movement information; and altering a virtual surface appearance of at least a part of the virtual object based on the movement information.

This brief description is intended only to provide a brief overview of subject matter disclosed herein according to one or more illustrative embodiments, and does not serve as a guide to interpreting the claims or to define or limit scope, which is defined only by the appended claims. This brief description is provided to introduce an illustrative selection of concepts in a simplified form that are further described below in the Detailed Description. This brief description is not intended to identify key features or essential features of the claimed subject matter, nor is it intended to be used as an aid in determining the scope of the claimed subject matter. The claimed subject matter is not limited to implementations that solve any or all disadvantages noted in the Background.

DETAILED DESCRIPTION

Figure 1:
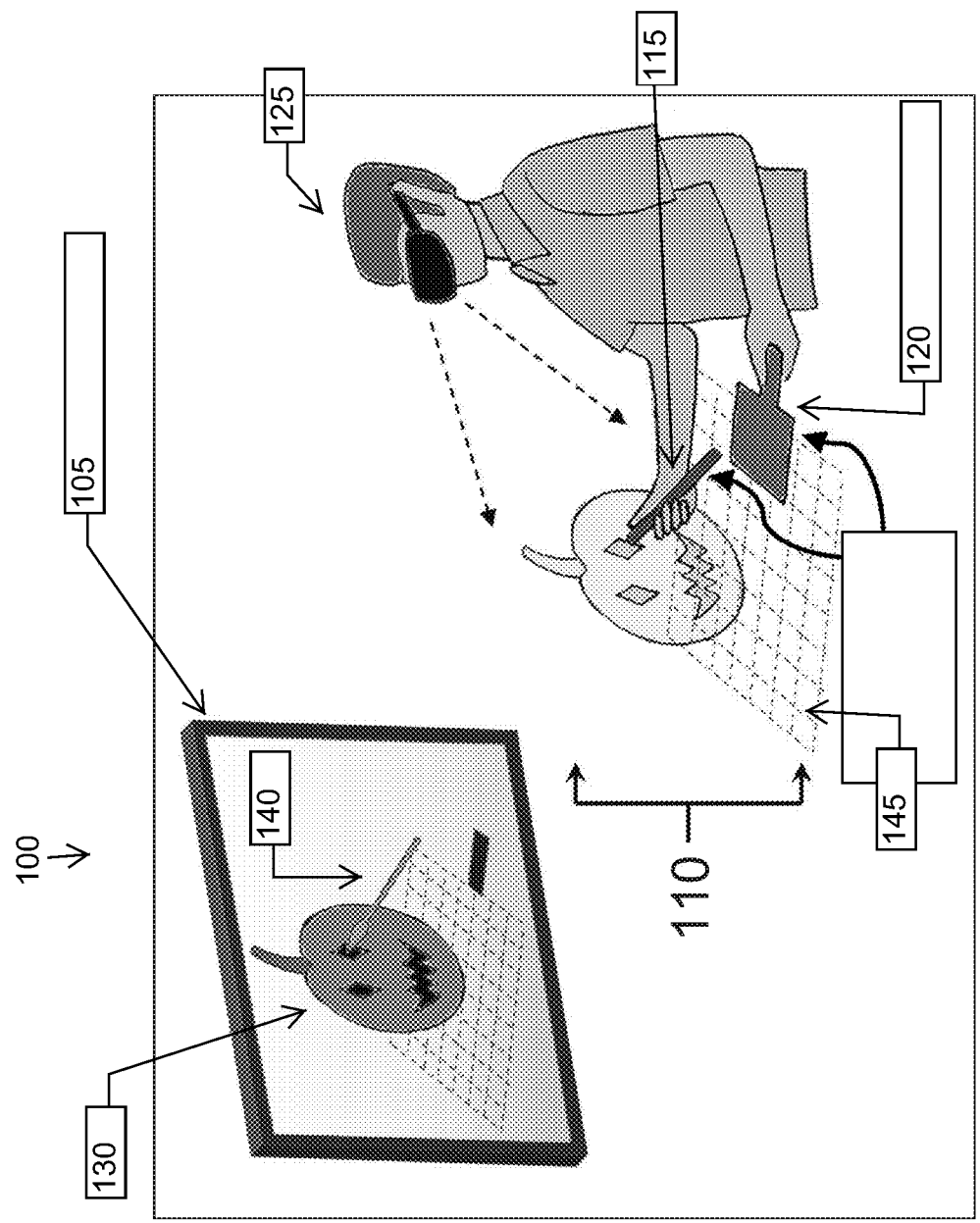
FIG. 1 shows a virtual carving operation.

Objects, features, and advantages of some aspects will become more apparent when taken in conjunction with the following description and drawings wherein identical reference numerals have been used, where possible, to designate identical features that are common to the figures. The attached drawings are for purposes of illustration and are not necessarily to scale.

Throughout this description, some aspects are described in terms that would ordinarily be implemented as software programs. Those skilled in the art will readily recognize that the equivalent of such software can also be constructed in hardware, firmware, or micro-code. Because data-manipulation algorithms and systems are well known, the present description is directed in particular to algorithms and systems forming part of, or cooperating more directly with, systems and methods described herein. Other aspects of such algorithms and systems, and hardware or software for producing and otherwise processing signals or data involved therewith, not specifically shown or described herein, are selected from such systems, algorithms, components, and elements known in the art. Given the systems and methods as described herein, software not specifically shown, suggested, or described herein that is useful for implementation of any aspect is conventional and within the ordinary skill in such arts.

Some aspects relate to tangible assisted interfaces for computer-human interactions, e.g., in three-dimensional virtual environments (also referred to herein as "three-dimensional image files"). A "virtual environment" or "three-dimensional image file" as used herein can include data representing one or more virtual objects in a virtual space. Such data can be stored in one or more computer-readable media or transferred between computers. Example data formats for virtual environments include the virtual reality modeling language (VRML), the X3D format, the COLLADA format, and 3-D computer-aided design (CAD) formats such as PARASOLID. Virtual environment data can also be represented using, e.g., voxels or meshes represented in other formats.

Throughout this description, unless otherwise expressly specified, references to a user taking any action with respect to a virtual tool, e.g., moving a virtual tool, orienting a virtual tool, attaching a property to a virtual tool, or otherwise configuring or using a virtual tool, signify that systems as described herein are receiving user input of commands to perform those actions with respect to the virtual tool and are causing the virtual tool to respond correspondingly. For example, systems described herein can detect motion of a physical proxy, e.g., a rod held in a user's hand, and cause a virtual paintbrush or other tool to move in a virtual space in a way corresponding to the way the user is moving the rod proxy in the real world around the user. The motions of the proxy in the real world are inputs to the system and the motions of the virtual tool in the virtual world are outputs of the system. As described herein, any effect that a virtual tool has on a virtual object is determined by systems described herein or in accordance with methods described herein, e.g., in response to input signifying user motion of a physical proxy.

Advancements in computing hardware and display media have fostered innumerable shape-modeling tools that enable users to interactively create, manipulate, and modify virtual 3-D objects. These tools have been extensively employed for supporting virtual design prototyping within engineering and architectural domains. But in spite of the widespread growth of digital shape-modeling tools, they remain difficult to use and require significant training. This is primarily due to their reliance on 2-D input devices (e.g., mouse, keyboards etc.) and WIMP based interactions that are inherently unsuitable for 3-D modeling tasks. WIMP based virtual 3-D interaction methods inhibit users' ability to create, manipulate, and modify virtual shapes in a straight-forward manner. Their use of 2-D control mechanisms for interacting with 3-D design models have historically constrained designers to work with procedural shape-modeling operations that are complex and non-intuitive. Since such interactions require users to mentally map their 2-D inputs into 3-D shape-modeling operations through GUI widgets, they are cognitively tedious to use and distract users' attention away from the design task. They also stifle creativity and exploratory design by not supporting spontaneity in the modeling process. In addition to such drawbacks, conventional virtual shape-modeling tools also ignore the physical role of designers since their interaction mechanisms are oblivious to real world user inputs and physical affordances. "Affordances" are properties of an object (real or virtual) that suggest to a user the possibility of the user's performing some action with the object. For example, handles afford holding or pulling, and buttons afford pushing.

Prior schemes fail to efficiently and transparently support 3-D shape-modeling activities. Some aspects herein augment the physical abilities of the designer and utilize the affordances of the surrounding environment. In prior schemes, designers often resort to low-tech physical artifacts such as sculpting tools, foam core, clay, and cardboard to construct 3-D models. Some aspects herein use the physicality involved in this shape-modeling approach to provide natural and intuitive modes of design expression and therefore to enable users to optimally focus on the design tasks, rather than the know-how of the modeling operations. In some aspects, designers are enabled to utilize their innate manual dexterity, learned and developed through natural human experiences, for using real world tools (e.g., pens, scissors, hammers, knives etc.) to perform physical design activities (e.g., assembling or taking things apart, sculpting, carving etc.) in a 3-D virtual space. Prior schemes do not permit using real world tools to perform physical design activities. Some aspects leverage natural human dexterity within virtual shape-modeling activities such that the complexity of the modeling operations is significantly reduced. Some aspects integrate expressive human actions and intuitive physical affordances provided by tangible hand-held objects within virtual shape modeling experiences and applications.

Some aspects permit picking up an ordinary physical object, without digital instrumentation or visible fiducial markers, assigning the object meaning in a 3-D virtual space, and expressively moving the object around in 3-D space to perform specific 3-D modeling operations. Some aspects permit holding and manipulating interactive, virtual devices or objects in a virtual 3-D environment using solely, e.g., passive objects free of fiducials (e.g., images or patterns that can be detected to locate an object in a captured image, also referred to as "markers") or transponders (e.g., radio-frequency beacons or other electrically or electromagnetically active devices that can be used to locate objects in a working volume, including sensors on objects that detect features of the working volume, e.g., the infrared camera on a WII REMOTE). As used herein, various aspects permit using physical proxies to manipulate 3-D environments combining virtual and physical aspects.

Various aspects use non-instrumented physical devices (proxies) as stand-ins for interactive virtual devices in a 3-D environment. As used herein, the term "non-instrumented" describes a physical object that does not have fiducials, transponders, or other features specifically configured for detection by or communication with a computerized system. Non-instrumented objects can have surface finishes (e.g., colors, patterns, or textures) or specific shapes provided those finishes or shapes are not specifically configured for detection by or communication with a particular computerized system. Non-instrumented can include electronic components provided those components are not specifically configured for detection by or communication with a particular computerized system. For example, a translucent toothbrush including a light-emitting diode (LED) that blinks while a person is using the toothbrush to brush that person's teeth can be a non-instrumented physical object with respect to a computerized system using a depth sensor (e.g., a depth camera), since the illumination of the LED is not relevant to the data the system captures of the toothbrush. A non-instrumented physical object of one computerized system may not be a non-instrumented physical object of another computerized system, and vice versa, depending on the way the system detects non-instrumented physical objects. In an example system using solely a depth sensor, an infrared-active device such as a WII REMOTE can be a non-instrumented physical object since the infrared-detection capabilities and buttons of the WII REMOTE are not capable of communicating with the system.

FIG. 1 shows an environment 100 for manipulating virtual objects. A user 125 holding a planar proxy 120 (e.g., a paddle-shaped cardboard cutout) in the left hand to support and freely manipulate a virtual object 130, in this example a jack-o-lantern. The right hand is holding a physical proxy 115 associated with a virtual sculpting tool 140 to carve the virtual object 130. The physical objects 120, 115 either directly embody, or provide functional metaphors for, possessing and controlling virtual shapes and their modeling tools. The physical affordances, which perceptually suggest how such objects are to be the handled and utilized, enable users to rapidly externalize creative ideas through realistic human actions. As a result, these affordances enable users to construct 3-D design models at low cognitive loads and gain proficiency with the shape-modeling tasks with minimal training.

In FIG. 1, the virtual pumpkin (object 130) is being carved using a cylindrical proxy 115 that represents a virtual version 140 of a real-world sculpting tool. The pumpkin 130 is rigidly fixed over a virtual plane 145. The planar proxy 120 is being used to control the orientation of this plane 145 along with that of the pumpkin 130. The user 125 can view the scene through 3-D glasses 150 or another 3-D interface, e.g., an augmented-reality interface. A conventional flat-screen display 105 can show a two-dimensional (2-D) projection of the 3-D world.

Some aspects provide human-computer interaction (HCI) modalities that enable users to conduct shape modeling activities with little or no prior instructions. Some aspects enhance the expressive power and efficiency of user interactions by harnessing users' physical capabilities, bodily awareness, and innate understanding of their surrounding environment. Some aspects use physical affordances of interface elements that directly suggest how the interface elements are to be used. The input mechanisms in some aspects use physical actions that are relatable to general human experiences. As a result, their usage is intuitive and can require minimal training and practice. Some aspects use low-cost motion sensing devices and computer vision hardware.

Some prior schemes include (i) digital controller based modeling, (ii) free-hand gesture based modeling, and (iii) instrumented proxy based modeling. However, digital controllers are often difficult to setup and require users to wear invasive and unwieldy devices. Free-hand gestures provide greater flexibility in their usage, but suffer from issues such as sensitivity to hand occlusions, dependence on camera position, and inability to provide tactile feedback. Instrumented proxies allow users to embed 3-D interactive capabilities within ordinary physical objects. However, prior schemes using physical proxies require electronic sensors or fiducial markers that non-technical users might not be able to appropriately set up. Some aspects provide superior shape-modeling interactions and permit interactively creating and manipulating virtual shapes, thereby increasing the creative complexity of virtual 3-D models that a user can make with ease.

Some aspects use interface elements that have physical form and serve as tactile handles for interacting with virtual 3-D objects. Such interface elements can include commonly available objects used as tangible proxies for directly creating and manipulating virtual 3-D shapes. Such tangible interactions are not confined to the computer desktop, but rather distributed among familiar objects that provide physical affordances inherently richer than the virtual widgets used in conventional shape-modeling tools. These affordances can reflect users' innate knowledge about how to handle and use the physical objects based on natural learning and understanding that occurs in day-to-Day human experiences. Some aspects use non-invasive depth sensors and geometry algorithms to track hand-held movements of the proxies in real time. In some aspects, proxies directly embody the virtual objects associated to them or provide functional metaphors for interacting with the objects.

In some aspects, the proxies used have relatively simple geometry (e.g., planar or cylindrical) such that their spatial configurations can be robustly tracked without the need for digital instrumentation or fiducial markers. A computational system according to various aspects can predict the spatial configurations of proxies during occlusions, based on predefined models and heuristic information. Some aspects permit kinesthetic control of the virtual objects and enhance proprioception, reducing users' cognitive loads. Since some example objects used as the proxies are commonly available or can be easily fabricated, they are readily acquirable at almost no extra cost.

Various prior schemes convert 2-D motions of a mouse into corresponding 3-D manipulations of virtual objects or use multi-touch or digital pen inputs to extend 3-D shape manipulation capabilities within 2-D media. However, the two-dimesionality of these methods inherently separates users' input actions from the virtual 3-D tasks. Dedicated 3-D input devices used in some prior schemes involve fine level movements of a stationary joystick or a spherical wheel using only the fingers of one hand. This prevents users from fully utilizing their full bodily range of motion, which is a natural part of human spatial interactions. Some aspects herein directly leverage users' pre-existing knowledge of handling and apply physical objects towards 3-D shape modeling. As a result, the inputs are based more on physical expression rather that explicit indication through intermediary widgets.

Various prior schemes use low cost depth sensors integrated with mainstream computing devices to provide free-hand gesture recognition systems for interacting with virtual 3-D shapes. For example, pinch gestures can be used for manipulating virtual shapes. However, various of these schemes require multiple sensors to overcome hand occlusions, or constrain shape manipulations to fewer than six degrees of freedom. Shape interactions using free-hand gestures in various prior schemes are afflicted by frequent loss of hand data resulting from tracking errors. Due to the complexity of the hand geometry and its vulnerability to self-occlusions, precise and consistent estimation of hand pose and orientation using a single-view sensor is very challenging. Additionally, the lack of tactile feedback in this method requires users to frequently divide their attention between the observing and the modeling tasks in the display medium and the physical adjustment of their hands, resulting in increased cognitive load. Some aspects herein use physical proxies to overcome various of these limitations of free-hand methods. For example, in some aspects, the proxies can be easily tracked using low-fidelity depth sensors and their spatial parameters can be robustly estimated during self-occlusion scenarios. The physicality of the interactions afforded by the proxies can also provide users with consistent haptic feedback. This helps users focus on the virtual modeling task and sub-consciously utilize their kinesthetic senses to determine how their hands are coordinating the 3-D interactions.

Various prior schemes use digital controllers, hand-held or hand-worn devices that enable users to provide direct spatial inputs. Some hand-held controllers utilize accelerometer based 3-D motion sensing and click button functionalities for interacting with virtual 3-D shapes. However, the fixed position of devices in some prior schemes limits users' mobility to small interaction spaces. Some prior schemes provide hand gesture recognition capability through the use of multi-sensor data gloves. But since these gloves are physically connected to the central computing system, they constrain users' range of motion.

The use of digital controllers normally requires users to hold or wear unwieldy devices that completely occupy users' prehensile capacity, leaving no room for other hand-based activities. Such devices can also be expensive to purchase and cumbersome to set up. In addition, shape modeling activities that rely on digital controllers have their usage strictly limited to the availability of these controllers. In contrast, in some aspects, physical proxies are not bound to the users' hands. They can be picked up and utilized only when the need arises, just as with any physical object user's use in day-to-Day experiences. Thus the interactions described herein can be used in conjunction with any other computational, interactive or physical activities that users might be involved with. Some aspects use ordinary objects that can be easily acquired as the proxies. Thus, the control mechanisms in the 3-D interactions are readily available and selectable from a wide range of commonly available objects, e.g., household objects. Thus the interactions are not limited to specific hardware availability. The proxies can be constructed from materials like cardboard or plastic. In some aspects, the proxies do not include electronic components.

Various prior schemes use electronic blocks as proxies for creating and manipulating virtual 2-D or 3-D shapes, navigating virtual 3-D scenes, interacting with presentation material, creating structured 3-D curves and surfaces, or manipulating virtual 3-D objects in brain surgery planning applications. One prior scheme includes a vision based system where any physical object can be used to spatially control a virtualized model of itself. However, this method imposes an inflexible physical set up so that the input sensor can distinguish the object from the hand holding it. Additionally, strict semantic association between the proxies and virtual objects also restricts transferability of a given proxy across multiple virtual objects. Various prior schemes use a single cubical proxy, with fiducial markers on its faces, to manipulate any virtual object. Various prior schemes use digitally instrumented proxies with functional grasping and shape modeling affordances associated with them. Various prior schemes contain electronic sensors.

Various of these prior schemes have their functionalities entirely dependent upon external addendums in the form of, e.g., electronic sensors or fiducial markers. This undermines the practical value of the resulting shape modeling applications because even though the physical proxies are readily available, users cannot conveniently set up the addendums as per the requirements of the interface. Physical proxies according to some aspects do not require or include such external addendums. Their spatial configurations can be tracked using, e.g., a purely vision based sensor, primarily due to the simplicity of their geometric structure. In addition, a wide range of variability is allowed in the shapes and sizes of the proxies.

Some aspects herein relate to frameworks, processes and methods for enabling the expression, manipulation, and exploration of 3-D free-form shape designs enabled through tangible interactions. In an example embodiment, the physical proxies are used as an intuitive modality for possessing and controlling virtual 3-D objects using two metaphors relatable to physical object handling activities. This 3-D interaction technique can be used in utilitatian applications such as constructive 3-D shape modeling and mechanical assembly. In another example, the proxies are used to spatially control specific 3-D modeling tools for designing virtual 3-D shapes. The 3-D shapes are directly created using expressive mid-air movements of the hand-held proxies. These interactions either directly add material over free space or geometrically manipulate pre-existing virtual shapes into a user-defined form. In another example, the physical proxies are utilized as instruments for measuring and dimensioning virtual objects to enable users to provide precise spatial inputs and geometric information during the 3-D modeling activities. Some aspects include a multi-user scenario, support in education based activities, and compatibility with augmented reality based interface systems. One hand or multiple hands of one or more users can be used to interact with the objects at the same time, just like in the real world. Users can, e.g., wear augumented reality glasses 150 (FIG. 1) or, e.g., face each other to interact with virtual objects. In some aspects, the shape, gestures near the shapes, and the contexts interact creating a virtual environment and objects in it that behave intelligently. In augmented reality or purely virtual environments, visual feedback may be provided to the user to indicate the virtual tool(s) being controlled by a given proxy, or the state of those tools (e.g., the virtual paint roller showing the currently selected texture in FIG. 14B). A virtual tool can resemble a proxy controlling that tool, or can resemble another shape or object.

Some aspects include an integrated environment combining above-Described features of some aspects, individual ones of which may also or alternatively be used independently.

Some aspects provide frameworks, processes and methods aimed enabling the expression and exploration of 3-D shape designs enabled through natural interactions using non-instrumented tangible proxies. Some aspects provide systems, system components, methods and processes involved in 3-D shape exploration.

Figure 2:
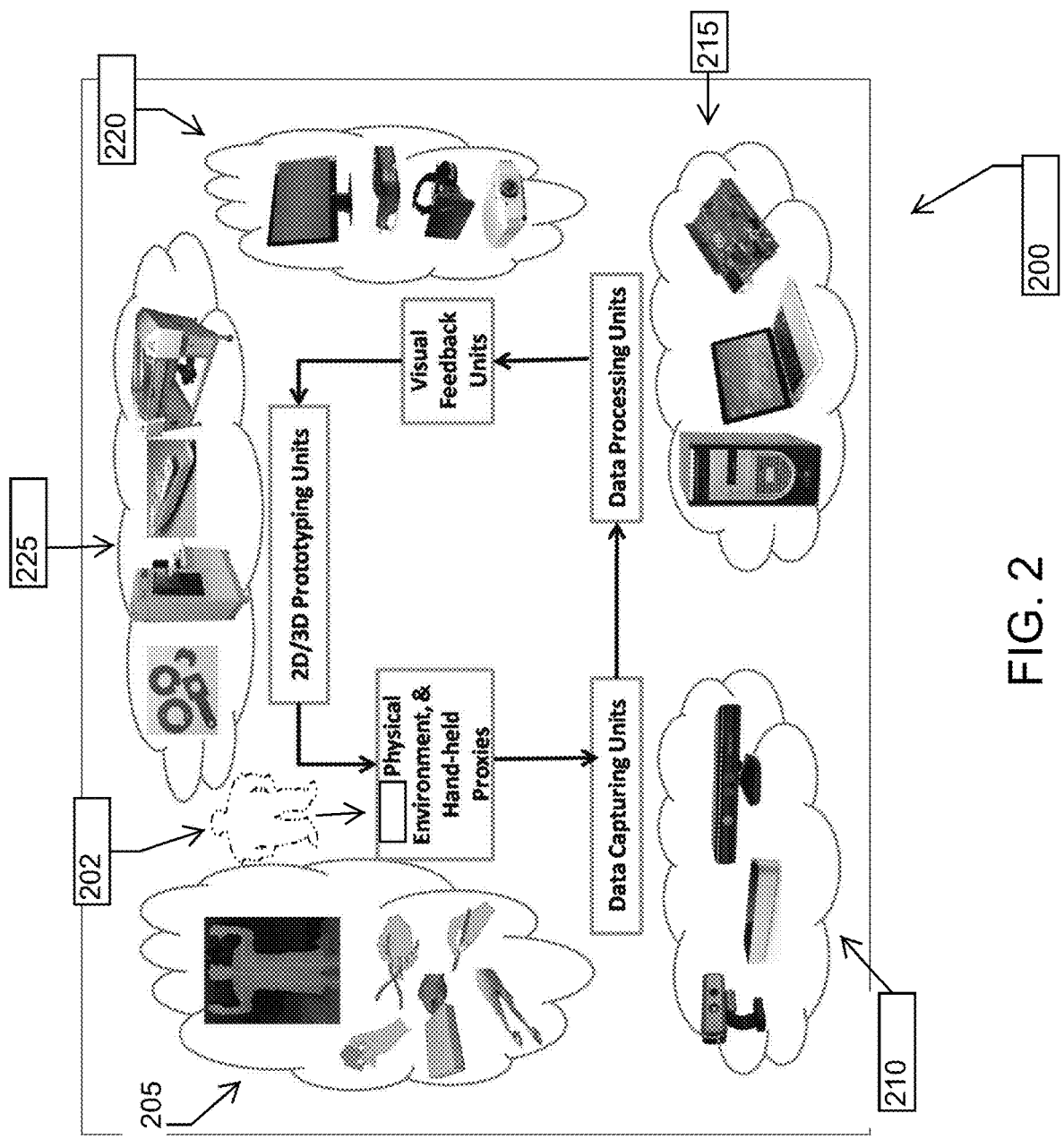
FIG. 2 shows dataflow in an example system.

FIG. 2 shows dataflow in an example system 200. Users 202 (shown in phantom) can provide direct spatial inputs through bodily actions and hand-held proxies. 3-D data from the user, physical environment and the proxies are acquired by the data capturing units. The data processing units can include processing systems that organize, reconstruct, and interpret the physical data acquired. The visual feedback units provide real-time outputs to users' spatial inputs and intentional gestures. The display media can be either traditional 2-D screens or VR and AR based visualizations. In addition 3-D objects created in virtual environments can be fabricated using rapid prototyping technologies.

A physical environment and tangible proxies used for 3-D interactions are shown at 205 and can be manipulated by a user 202 (shown in phantom). Human and environment data capture units are shown at 210. Data processing units are shown at 215 and can include, e.g., computing devices discussed below with reference to FIG. 25. Visualization/feedback units are shown at 220. The user can be a designer or a person modeling 3-D shapes.

Referring to block 205, the physical environment can include the user's spatial surrounding, including, e.g., empty design-studio space, a table-top surface equipped with some visualization capability, a vertical wall setup with visualization capabilities, or a touch-Display device capability. The tangible proxies are physical objects that users can hold and manipulate while creating and interacting with virtual 3-D models.

Referring to block 210, the human and environment data capture unit includes a hardware device which is capable of providing data regarding the locations and motions of one or many users in the environment in a non-intrusive or untethered manner, e.g., without the user requiring to wear external devices on the body for the purposes of capturing data. In various examples, such a device can include a commodity depth camera such as Microsoft Kinect™, Leap Motion™, or the SoftKinetic DepthSense™.

Referring to block 215, the data processing units can include one or many computing devices which can interpret the data acquired by the data capturing unit and convert those interpretations into meaningful actions in applications. These units can include a standard personal desktop computer, laptop computer or a programmed embedded system including microcontrollers like the Arduin™.

Referring to block 220, the visualization/feedback unit is responsible for providing a visual feedback of the shape modeling processes and operations being performed by the user. This unit may include a standard visual display like a computer screen, or a head-mounted display used in virtual reality (VR) systems or augmented reality displays. Visualization may also occur using a projector-wall or projector-table arrangements.

Referring to block 225, the prototyping units may include a laser cutter or 3-D printer to produce user created custom objects of or from the 3-D models created using interfaces and techniques herein. These models can be sent as an order to a remote location and provided as a service to users.

Some aspects provide a natural one-to-one mapping between the visualization environment and creation/interaction environment so that users' hand movements are natural without needing a distance mapping between the visualization and hand movements. This can be useful, e.g., in gaming environments, to increase the user's sense of involvement.

Figure 3:
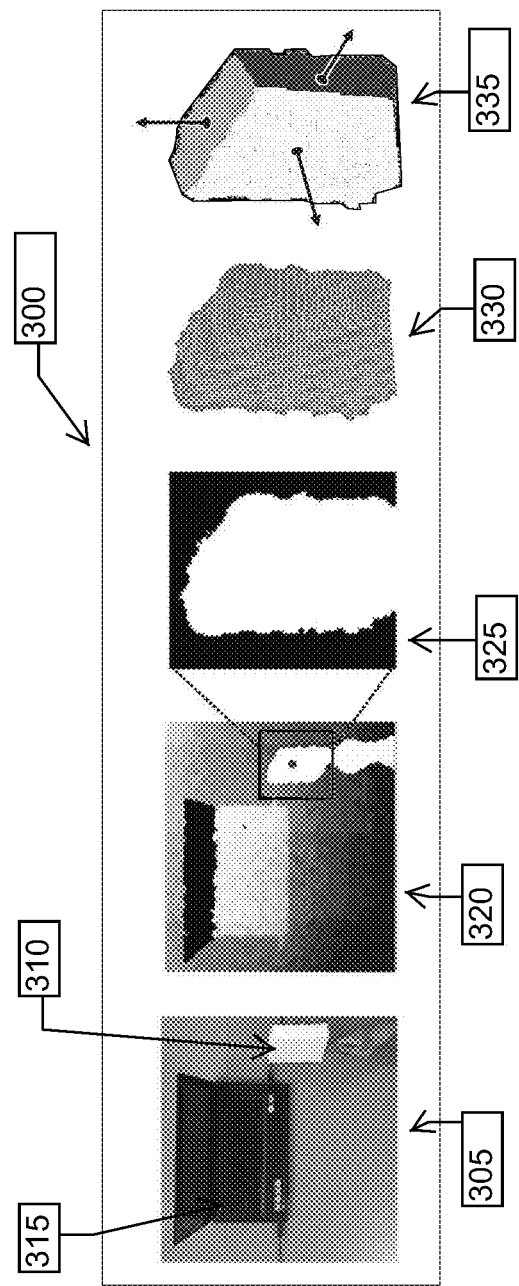
FIG. 3 shows example images at various points in an example processing pipeline of a physical-proxy tracking process.

FIG. 3 shows example images at various points in an example processing pipeline 300 of a typical physical proxy tracking process. In various aspects, tracking is non-invasive and is performed using a purely vision based sensor. Physical data from a proxy is acquired by the depth sensor as a 3-D point cloud and a depth image. This raw data is processed to quantify the proxy's parameters that define its spatial configuration.

In FIG. 3, a rectangular-prism-shaped proxy is being tracked using a commercial depth sensor. Block 305 graphically represents a camera image of the scenario, including the proxy 310 and a laptop 315. In some examples, to engage a proxy, a user holds it close to the camera. This gesture indicates to the system that the user wants it to detect and begin tracking the proxy. To disengage the proxy, the user can simply put the proxy down on the table or other work surface below the camera. Block 320 graphically represents a depth image captured by the depth sensor, which looks down on the scene. Block 325 graphically represents the proxy's depth image extracted from the full image visible to the depth sensor (block 320). Block 330 graphically represents a 3-D point cloud of the pixels in the depth image of block 325. The 3-D point cloud, when subjected to geometry processing algorighms (e.g., K-means, Principal Component Analysis) yields the parmeters that define the proxy's real time spatial configuration. In some examples, the system includes a database of information about what kinds (e.g., shapes) of proxies can be used and what they look like, based on their geometry. When the user places a proxy close to the camera, the system first recognizes what proxy is being brought to it for engagement by matching the detected geometry to geometry information in the database. In some examples, a shape-specific tracking algorithm is used to track proxies of specific shapes listed in the database. Block 325 graphically represents an example in which the points have been classified according to the respective faces of the proxy. The normals of the faces are illustrated using arrows. In some examples, the database stores geometric models for each proxy, and the system includes pre-defined, shape-specific algorithms for both recognizing and tracking the proxies during engagement with the system.

Some aspects provide tangible shape possession and tangible shape modeling. These are referred to collectively as "shape exploration." Shape possession can include pick-place-orient operations, e.g., rigid body translations and rotations. Shape modeling can include the use of hand-held motions of a physical object (proxy) to create virtual 3-D shapes, e.g., from scratch, within, e.g., an empty working volume. Shape modeling can include interactions with shapes with the intention of changing the geometric characteristics of the shape and modification of its general appearance as intended by users.

Virtual shape possession can be an interactive operation that involves holding or manipulating virtual objects in 3-D space. Virtual possession can be used for interactively defining the 3-D configurations of virtual objects and specifying spatial relationships between them. Herein "Tangible Possession" refers to interactions that use hand-held proxies to possess and spatially control virtual objects. The virtual objects that can be spatially possessed can include the 3-D shapes being constructed or the modeling tools used for creating and modifying the shapes. Tangible Possessions allows users direct control over virtual elements within the active virtual 3-D environment that users are engaged in. For example, users can vicariously hold and manipulate virtual objects in a physically plausible manner that is relatable to the act of handling of physical objects. This is in direct contrast to prior controller/proxy based 3-D interaction schemes, where a single, generic physical device is used with any virtual 3-D object. In some aspects, the proxies are selected based on the type of virtual objects being handled, the possession metaphors being used, or the specific possession functionality required. This not only provides users with flexibility in proxy selection and availability, but also allows utilization of a structurally and semantically appropriate control medium in during 3-D shape interactions. In some aspects, proxies are selected having inherent tactile cues that enable users to physically feel the spatial configurations of the virtual object they are in possession of. This facilitates kinesthetic and proprioceptive control over the digital content at a low cognitive load and reduces the need for conscious attention towards the handling of the proxy. As a result, users can focus more on the virtual 3-D tasks, rather than the operation of the interaction. Various examples use direct shape possession or functional shape possession.

Figure 4B:
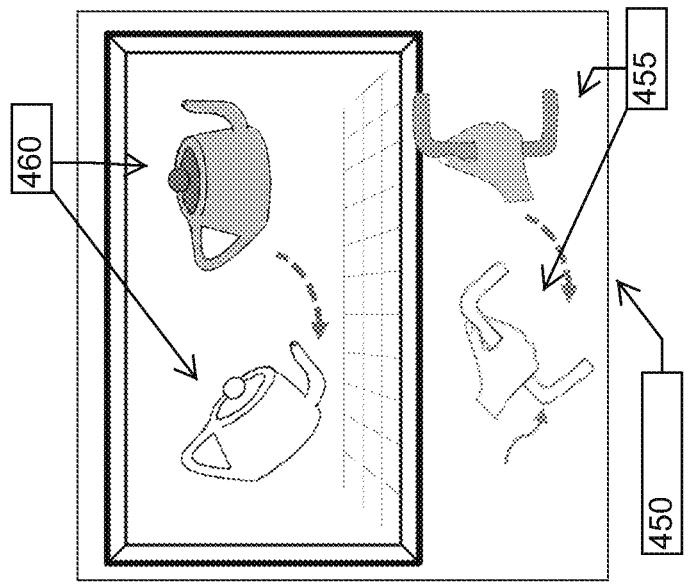
FIGS. 4A-4B show examples of direct possession of virtual objects.
Figure 4A:
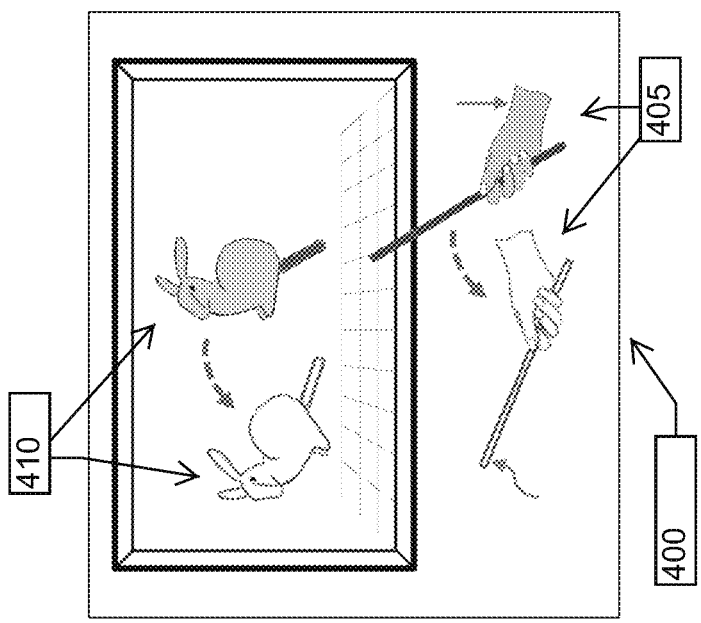

FIGS. 4A-4B show an example illustration of direct possession of virtual objects using two different kinds of proxies with simplistic geometries. FIG. 4A illustrates attaching a cylindrical proxy 405 to a virtual 3-D model 410 for holding and manipulating in 3-D space, in some examples. FIG. 4B illustrates associating a C-shaped proxy 455 with the handle of a virtual teapot model 460 to permit the user directly control the spatial behavior of the virtual teapot 460 in an intuitive and physically plausible manner.

In various aspects, the set of proxies that support direct possession of virtual objects can include simple 3-D primitives such as planes, cubes, spheres, and cylinders. Here, the proxies either directly represent the virtual objects they are in possession of or provide a physically plausible way of holding and manipulating the objects. In FIGS. 4A-4B, there are shown two examples of how direct shape possession is implemented in various examples. In these examples, the spatial behaviors of individual ones of the hand-held proxies 405, 455 are directly transferred to the corresponding virtual counterparts. These counterparts can be either rigidly fixed to a virtual 3-D object or associated with a specific geometry on the object. Such association provides users direct control of the virtual objects as if they were really physically holding the objects. Users' spatial movements thus get analogously imparted to the virtual objects. In FIG. 4A, a cylindrical rod 405 is rigidly fixed to a virtual 3-D model 410 such that the model 410 moves in accordance with the motions of the rod 405. This rod 405 can be detached anytime from the model 410 and reattached to it along a different orientation. This provides users with high ergonomic flexibility in terms of how they hold and manipulate the virtual objects. This mode of 3-D shape possession can also be used with other proxies (e.g., a planar proxy or cubical proxy). In FIG. 4B, a C-shaped proxy 455 is directly associated with the handle of a 3-D teapot model 460. This association allows users to control the model in a manner that is physically consistent with the model's design intent. Similarly, simple proxies can be associated with a specific design feature on a virtual 3-D object to enable users to hold and manipulate them in a perceptually and functionally appropriate manner. The associations described herein are provided by software that detects the orientation and position of a proxy and adjusts the orientation or location of a virtual model (e.g., model 410, 460) within a 3-D virtual environment, as discussed below.

Various examples permit clutching and releasing virtual objects using physical proxies, e.g., using actions on or with proxies that can be easily identified by the central data processing units. Example actions include tapping onto a virtual object, scooping up an object, piercing or slicing across an object, or lightly shaking off a possessed object.

These actions can directly imply clutching or releasing activities that are commonly employed in day-to-Day physical object handling tasks. These actions can be non-Disruptive to the general flow of 3-D interactions within the virtual environment. In addition, they can also reduce or eliminate the need for external addendums for explicit digital inputs. Various examples can be easily integrated within an ordinary desktop setting that provides access to traditional input modalities such as mouse and keyboard. Thus, minimally required click button functionalities can be readily available during the use of proxies.

Figure 5B:
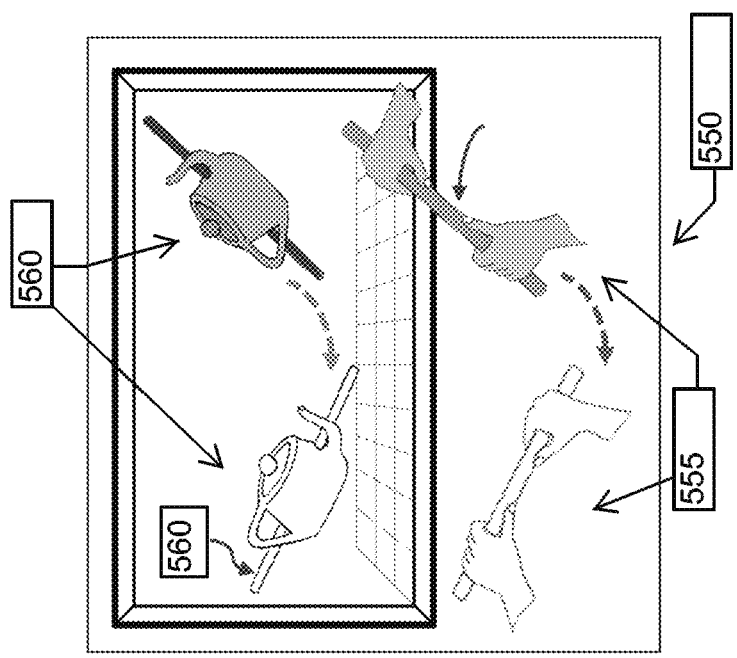
FIGS. 5A-5B show examples of functional possession of virtual objects.
Figure 5A:
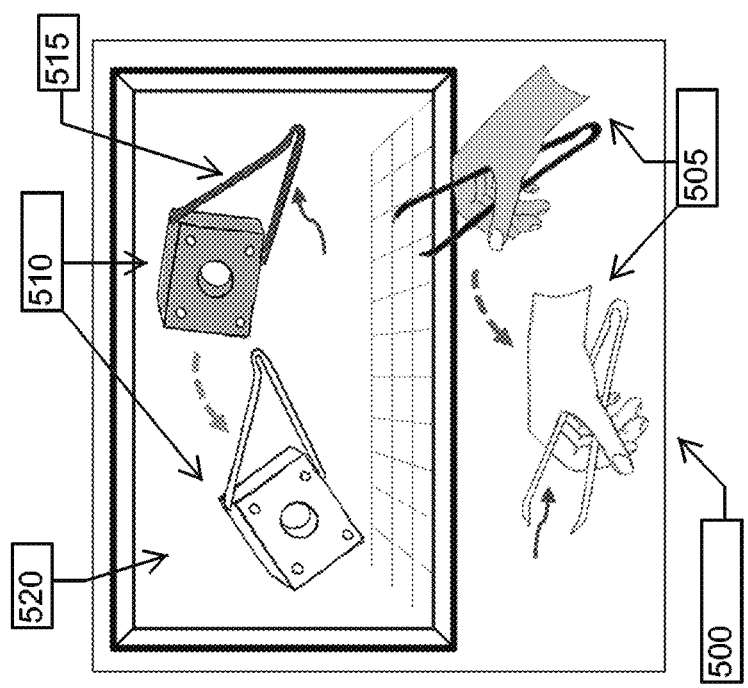

FIGS. 5A-5B shows examples of functional possession of virtual objects using two different kinds of proxies with simplistic geometries and inherent grasping affordances. FIG. 5A shows a pair of tongs 505 being used to hold and manipulate a virtual 3-D object 510. A tong-like or scissor-like proxy 505 can also or alternatively be used to control a virtual pair of scissors or to scrape virtual material off a virtual object. FIG. 5B shows a cylindrical rod 555 being used as a skewer to hold a virtual 3-D object 560. A cylindrical or otherwise extended proxy 555 can be also or alternatively be used to control a virtual paintbrush or drill.

These and other aspects herein use proxies having grasping functionalities. Examples include pincers, tongs, skewers, ladles, and spatulas. The identities of these objects can be familiar to users and thus their usage can be directly suggested by their commonality and structural attributes. As a result, users can require almost no learning and minimal practice before they can proficiently begin using these proxies. FIGS. 5A-5B provide examples to how this interaction can be employed to possess virtual objects. In some examples, clutching and releasing virtual objects can be attained by directly applying the grasping affordances of the proxies. This can be done without external digital inputs or physical action based metaphors.

FIG. 5A provides an example of how a users grasping capabilities can be extended into the virtual environment through a physical proxy including a pair of tongs or pincers 505 used to manipulate virtual object 510. This mode of shape possession is applicable to a wide range of virtual 3-D shapes and is thus highly versatile and generic in its usage. As shown, a graphical representation 515 of the proxy 505 can be presented in the virtual 3-D environment 520. FIG. 5B shows another example of such a proxy. Here, a rod 555 (e.g., a cylindrical rod) serves as a skewer for holding virtual objects 560. A virtual skewer 565 can be shown with virtual objects 560. Manipulating the skewer proxy 555 like a handlebar enables users to simultaneously rotate and translate virtual objects in 3-D space. Proxies like skewers and ladles also enable users to possess multiple objects at the same time and spatially control them in a synchronized manner. In some examples, proxies having one or more axes of symmetry (e.g., rotational symmetry) can be used for interactions not requiring knowledge of motion about such axes (e.g., tip location and orientation of a cylinder, as opposed to roll of that cylinder about its long axis).

Various aspects permit free-form spatial manipulations of virtual objects, e.g., by providing concurrent access to the objects' 6 degrees of freedom (DOF). To facilitate precise control of virtual objects, as required by several shape modeling operations, various aspects provide mechanisms for constrained object manipulation along a unique degree of freedom. For example, the skewer in FIG. 5B provides a linear direction along which a shape can be translated or about which a shape can be rotated. Similarly, for other proxies where such direction is not directly available, various aspects permit keeping a possessed object suspended at a stationary location.

Figure 6C:
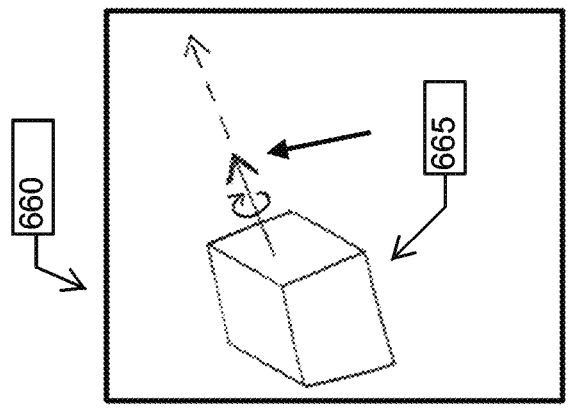
FIG. 6A-6C show examples of constrained manipulation.
Figure 6B:
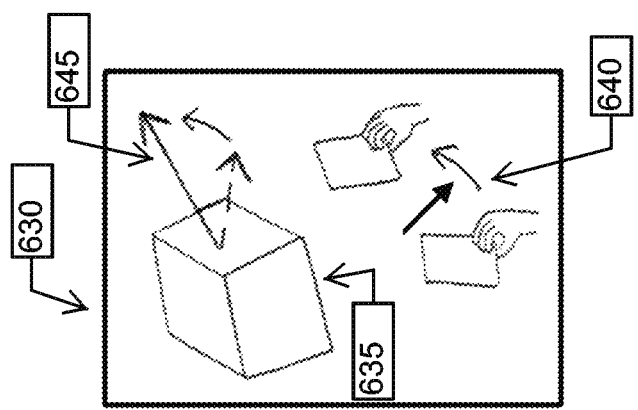
Figure 6A:
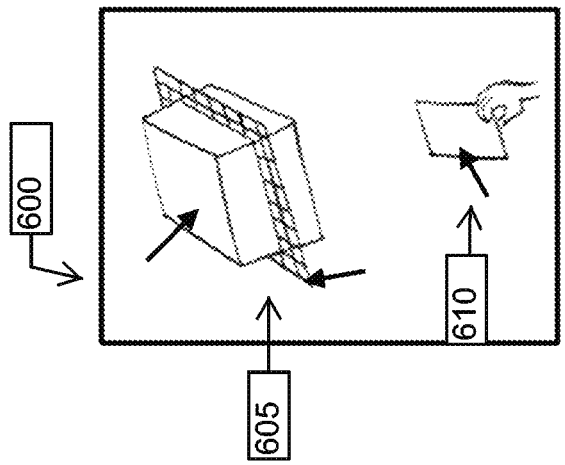

FIGS. 6A-6C show an example of constrained manipulation using Tangible Possessions. FIG. 6A shows a virtual object 605 being kept at a stationary location controlled by proxy 610. FIG. 6B shows adjusting the direction 645 for constrained DOF manipulation using the proxy 640 itself, e.g., in response to user motion of the proxy 640. FIG. 6C shows translation or rotation operations of virtual object 635 performed along direction 645 by moving proxy 640. In some examples, while tracking the planar proxy (or other proxies having flat surface(s)), the system measures the plane's normal direction between subsequent frames (instances). Since the system can operate, e.g., at 30 frames per second, it is safe to assume that the angular displacement of the plane normal between two consecutive frames is small (below a predefined threshold). When the system detects a large angular displacement (above the threshold) between successive frames, the system can determine that that the proxy has been flipped and the surface formerly pointing up is now pointing down. This permits the system to track which side of, e.g., a planar proxy is oriented in the hemisphere facing the camera ("up").

As shown in FIGS. 6A-6C, the user can specify the direction 645 along which the translation or rotation is to be carried out. This specification can be carried out directly with the proxy 640 itself. The direction 645 can be indicated in the virtual 3-D environment, as shown, by an arrow with its starting point at the stationary virtual object's (635) centroid. The proxy 640 can control the tip of the arrow and the arrow can thus be positioned at any spatial location the user chooses. Once the direction 645 for constrained-DOF manipulation is finalized, the virtual object 635 can be translated along this direction 645 or rotated about the direction 645. The spatial movements of the virtual object 665 in response to the proxy 640 are constrained to direction 645.

"Tangible Modeling" refers to modeling 3-D shapes in a virtual environment using proxies as described herein. Various aspects use tangible interactions with proxies as the principal input modality for creating virtual shapes. Here, interactions such as those described above (e.g., Tangible Possessions) permit spatially controlling both virtual shapes and the virtual tools used for modeling the shapes. Tangible Modeling enables creation as well as modification of 3-D shapes in two ways: (i) the components of the 3-D model being created can be directly possessed and spatially configured to collectively define meaningful design representations, and (ii) virtual modeling tools can be spatially controlled for directly interacting with an existing geometric model, such that users' spatial actions can provide meaningful modifications to the model.

Figure 7:
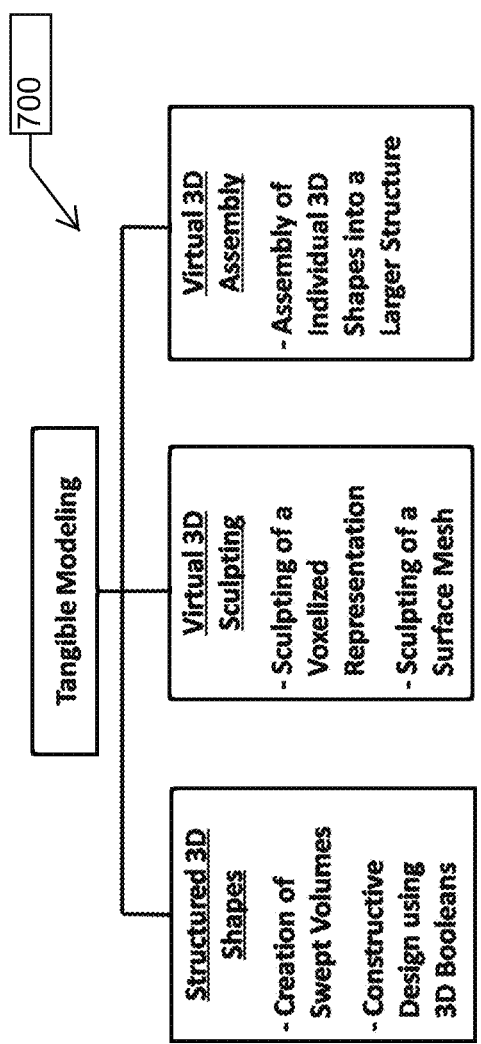
FIG. 7 shows an example of tangible modeling.

FIG. 7 shows examples 700 of tangible modeling. Tangible modeling permits creating virtual shapes using structured shape modeling operations such as generalized sweeps and constructive solid geometry.

Figure 8B:
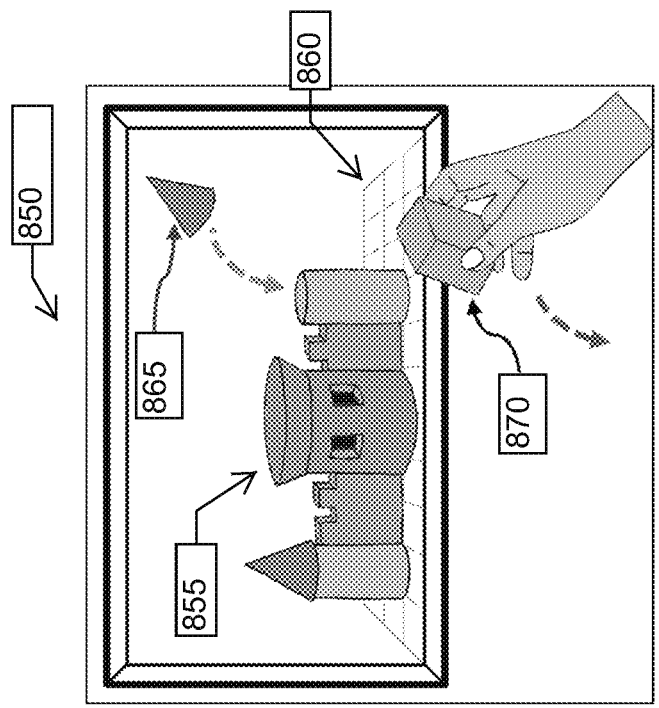
FIGS. 8A-8B show examples of tangible-modeling interactions.
Figure 8A:
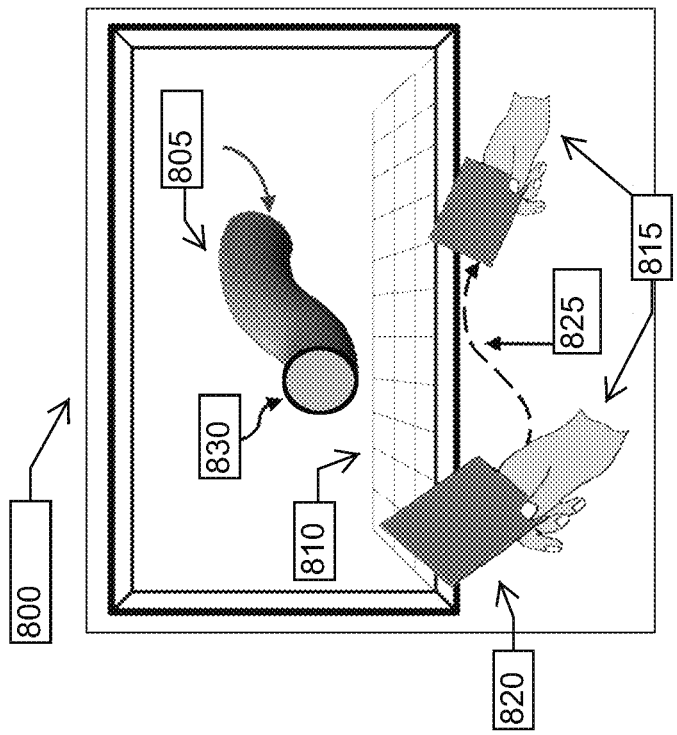

FIGS. 8A-8B show examples of tangible-modeling interactions, e.g., creation of structured 3-D shapes using Tangible Modeling. FIG. 8A shows an example in which generalized sweeps can be created by anchoring a profile 830 to a physical proxy 815. The motion 825 of the proxy 815, e.g., with free-form or spatial constraints, defines the geometry of the swept volume 805. FIG. 8B shows an example of performing constructive design creation using Boolean operations of pre-defined 3-D shapes 855. One or more physical proxies 870 provide a medium for possessing and spatially configuring the individual components of the design model (shapes 865) in an additive or subtractive manner.

As shown in FIG. 8A, a 2-D profile 830 can be anchored to a planar proxy 815. Motion of the proxy 815 can be detected as the user moves the proxy 815 along a 3-D path, e.g., starting at position 820. A freeform swept volume 805 can be defined corresponding to the detected motion of the proxy 815 and the shape of the profile 830. The resulting swept volume 805 can be either totally free-form in nature or constrained by spatially defined bounds.

FIG. 8B shows an example of constructing (possibly complex) 3-D shapes through Boolean operations on simple geometric primitives. As shown, a physical proxy 870 can serve as a tangible medium for spatially positioning and orienting the virtual building blocks 865 of the intended virtual shape 865. In some examples, the individual components of an intended design can be pre-defined. The Boolean operations of new components within a design can be performed in the following non-limiting example ways: (i) addition of a components to the body of the design being constructed, or (ii) removal of a sub-volume from the design where the volume is geometrically equivalent to and coincides with the 3-D configuration of the new component.

The individual components used in the Boolean operation can be of the following nonlimiting example types: (i) pre-defined geometric primitives that are by default available in the design application, (ii) swept volumes created using the aforementioned swept volume creation techniques (FIG. 8A). In some aspects, during configuration of the Boolean components, users can change the relative size of the components by scaling them. This allows users to directly compare the relative size of a new component to the overall structure being constructed and thus adjust its scale to fit the larger design context.

Figure 9A:
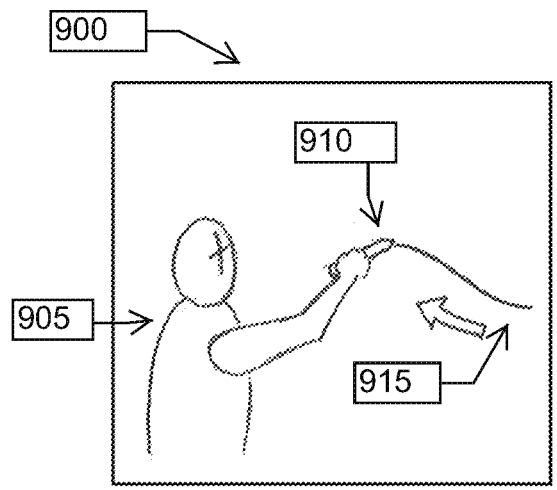
FIGS. 9A-9B show an example of a swept trajectory.
Figure 9B:
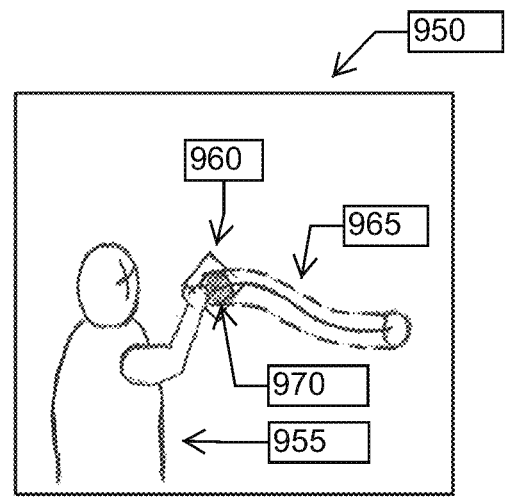

FIGS. 9A-9B show an example in which the swept trajectory 965 is constrained using a pre-defined 3-D trajectory 915. For example, users can directly sketch the trajectory 915 the profile 970 will follow using a stylus like proxy 910. In FIG. 9A, a 3-D trajectory 915 can be sketched, e.g., by a user 905, using a proxy 910 such as a stylus. The trajectory 915 can be traced in mid-air. FIG. 9B shows an example in which a proxy 960 representing a profile 970 is positioned (e.g., by the user 955) along the trajectory. The profile 970 can be extruded along the trajectory 915 to define the swept volume 965. This profile 970 can be constant or variable. Sweep profiles 970 can be placed at any point of the trajectory 915 to cause the swept volume 965 to pass through the profile 960 at that point along the trajectory 915.

Figure 10B:
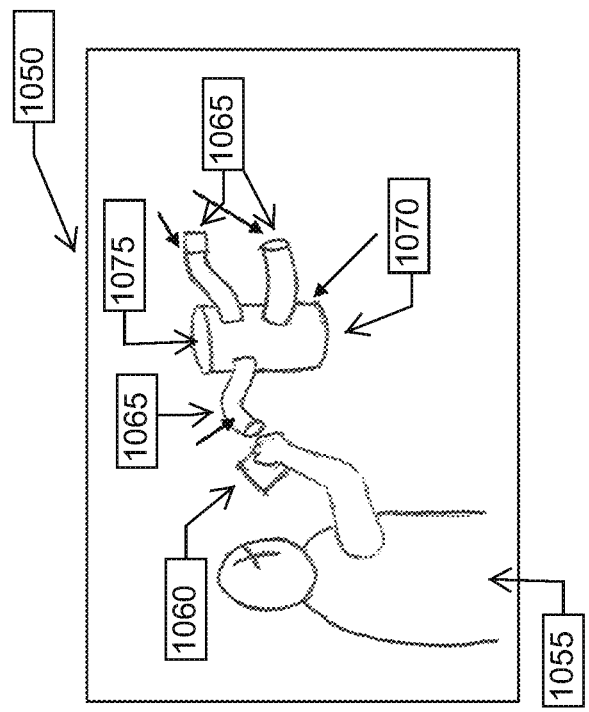
FIGS. 10A-10B show an example of a swept volume.
Figure 10A:
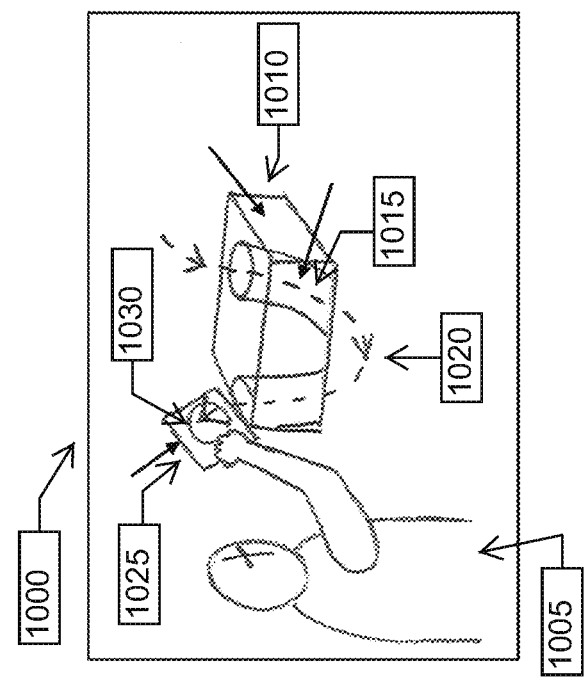

FIGS. 10A-10B show an example in which the swept volume 1015 is created whenever the movement of the proxy 1025 lies within a pre-defined 3-D region 1010, e.g., of creating a swept volume 1015 within pre-defined 3-D bounds 1010. The shape and size of the 3-D bounds 1010 is variable. As shown, the proxy 1025 can represent a profile 1030 of the swept volume 1015. Motion of the proxy 1025 along a trajectory 1020 can be detected. A swept volume can be defined along the trajectory 1020 when the proxy 1025 moves within the 3-D bounds 1010.

FIG. 10B shows an example in which a design 1070 is created by incrementally adding swept features 1065 to the overall body 1075 of the design. The user 1055 can move a proxy 1060 to define new swept features 1065. In this example, new sweeps are spatially constrained to be attached to the surface of a pre-existing shape, at the closest location to the starting point of the new sweep. This allows for incremental construction of the final shape.

In some examples, sweep operations can remove material from a pre-existing virtual model. In addition, users can also vary the sweep profile at different locations by either explicitly suspending the sweep operation to replace the profile or by placing differently shaped profiles at unique locations within the physical bounds that define the sweep geometry. In addition, metaphorical actions such as shaking the proxy or explicit voice commands can be used to scroll across a list of planar profiles at any instance during free-form sweep creation. Thus, various aspects can support creation of both uniform and variable cross sectional sweeps. The swept volumes are individually created, but all collection of such volumes can yield a larger design representation. Thus each sweep can serve as a distinct feature of a design part or structure.

Figure 11B:
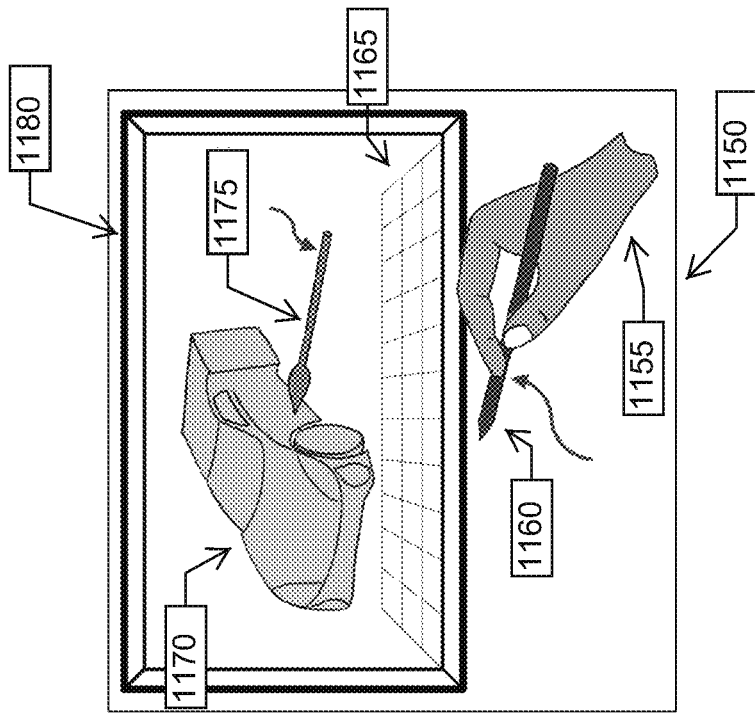
FIGS. 11A-11B show example techniques for creation of virtual sculptures.
Figure 11A:
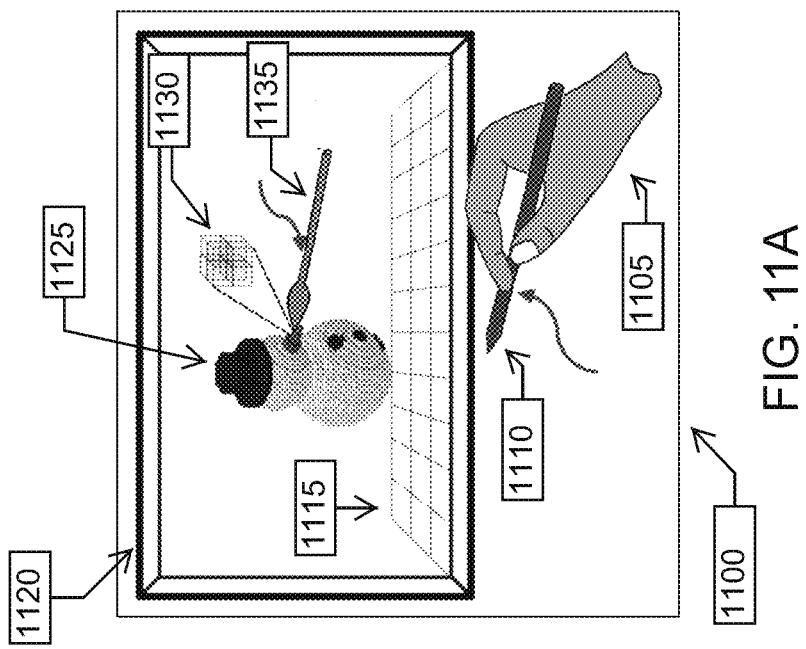

FIGS. 11A-11B show example techniques for creation of virtual sculptures. Appropriate proxies 1110 enable spatial control of specific sculpting tools 1135 in the virtual 3-D environment 1120.

Various aspects enable users to create virtual sculptures by employing a sculpting process, e.g., analogous to the physical activity of foam core sculpting. In these aspects, hand-held proxies 1110 provide a medium for possessing and manipulating the virtual sculpting tools 1135. These virtual tools 1135 can be interactively used to perform sculpting tasks (e.g., carving, filing, smoothening, drilling etc.) on a block or lump of virtual material 1125 to create sculptures. Similar tool based metaphors can also be used in both fine level and global scale detailing operations such as painting, etching, and embossing on the sculptures or any other virtual object 1125. Various aspects use simple, non-instrumented, and easily acquirable objects as the proxies. Various aspects use, as a geometric representation for sculpting, multi-LOD (level-of detail) volumetric models permitting a user will be able to shape, refine and provide detail to objects. Using simple gestural operations for spatial scaling, a user can navigate the same object at different resolutions. This permits creating global as well as very fine features in a unified geometric framework.

Various aspects permit extending volumetric modeling to implicit modeling methods, e.g., for modeling of organic 3-D models. In some examples using implicit modeling, a function is used to define a scalar field in a 3-D space. Shapes can be created by manipulating the parameters of this function at discrete points of this space. E.g., in sculpting examples, the scalar field corresponds to the presence and thickness of virtual sculpting material. By interactively carving out a region over this material with a virtual tool controlled in response to motion of a physical proxy, users can indicate material removal. Here, the carving action is used by the system to incrementally alter the scalar field parameters at that region such that the material progressively dissipates at that region.

Various aspects use implicit surfaces to provide interaction-centric metaphors for sculpting. Implicit surfaces can be used with hybrid geometric representations. Implicit surfaces can be used as a technique for rendering the boundary of a virtual shape. They can be automatically computed through the function defining the scalar field in an implicit model as described above. In some examples, an implicit surface is constructed by the system along the outermost region of the implicitly-modeled virtual sculpting material, such that the implicit surface represents the material's external boundary.

Various aspects provide representation-specific tool metaphors wherein different tools can be used for geometric representations (such as B-rep, polygonal meshes, voxels, constructive solid geometry (CSG) primitives and operations, and implicit surfaces) within a single modeling environment. As used herein, the term "boundary data" refers to any data defining the location or properties of a boundary or surface of a virtual object, whether the underlying geometric representation of that virtual object includes meshes, voxels, or another representation. In some examples, virtual objects can be represented (or created) using several kinds of geometric representations. A hybrid geometric representation is when more than one of such representations is used to create a single virtual shape.

FIG. 11A illustrates an example of sculpting a voxelized representation at multi-levels of detail, e.g., by directly adding or removing individual voxel units 1130. The resolution of the voxel representation can be varied across a single model 1125 such that multi-level of detail sculpting can be achieved, as graphically represented by the subdivision of voxel units 1130.

FIG. 11B shows an example of sculpting a mesh based representation of a virtual object 1170 via a proxy 1160 by deforming the meshed object 1170 at both global and local levels. As shown, a virtual sculpting tool 1175 can directly deform geometry, e.g., an initial seed geometry (a simple shape, e.g., a cube, sphere, cylinder, or ellipsoid, that a user can start with during the sculpting process) through the following nonlimiting example operations: (i) carving, (ii) etching, (iii) embossing, (iv) filing, or (v) smoothing. A variety of virtual sculpting tools 1175 can be used to perform these specific sculpting operations. FIG. 11B shows a mesh deformation based virtual sculpting process using Tangible Modeling. In various examples, proxies with simple geometries such as cylinders, flat planes, or spheres are used as physical and generic counterparts (proxies 1160) to the virtual sculpting tools 1175. These proxies 1160 are both structurally and semantically related to the virtual tools 1175, making the sculpting task intuitive and relatable to the actual process of physical sculpting.

Figure 12:
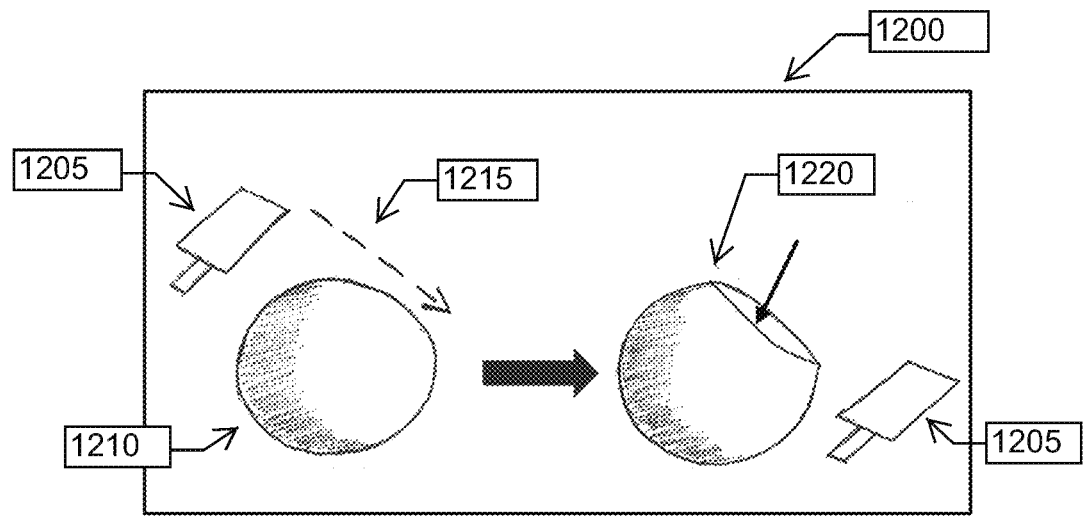
FIG. 12 shows an example of control of a virtual cutting tool.
Figures 13A, 13B:
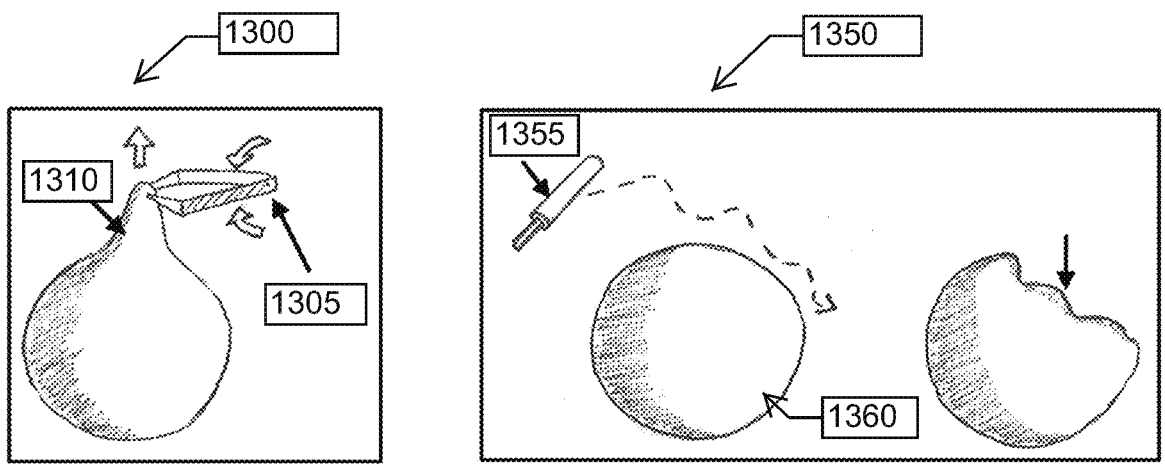
FIG. 13A shows an example of control of a virtual deformation tool.
FIG. 13B shows an example of control of a virtual shaping tool.

FIGS. 12, 13A, and 13B show examples where a physical proxy (not shown) is used as a medium for controlling a virtual tool 1205 with specific sculpting or shape modification functionalities. The proxies controlling tools generally have a structure that can be easily tracked via the depth sensor. However, the virtual tools can include intricate details that provide complex shape modeling capabilities.

FIG. 12 shows an example in which a planar proxy (not shown) is used to control a virtual cutting tool 1205. This tool 1205 can be used for slicing off chunks of volume from a virtual 3-D model 1210, forming model 1220. This type of a tool 1205 is particularly useful in carving applications where an initial shape representation needs to be roughly cut out.

FIG. 13A shows an example in which a pincer-like proxy (not shown) controls a virtual tool 1305 used to deform local regions on a virtual 3-D object 1310. This proxy is useful in creating fine level details within a 3-D model.

FIG. 13B shows an example in which a cylindrical proxy (not shown) controls a virtual tool 13550 rolled along the exterior of a virtual 3-D object 1360 to form a distinct shape over a local region of the object 1360. This action is analogous to molding a lump of dough using a roller.

In addition to deforming the geometric structure of the virtual shapes, the sculpting metaphor is also applicable in applying external colors, textures, and patterns over the surface of the shapes. Various aspects permit users to provide aesthetic attributes on the modeled 3-D designs in a way that is similar to the physical activity of painting, etching, patterning, or embossing over real-world artifacts.

For example, referring back to FIG. 11A, a stylus proxy 1110 can control an aesthetic detailing operation.

Figure 14B:
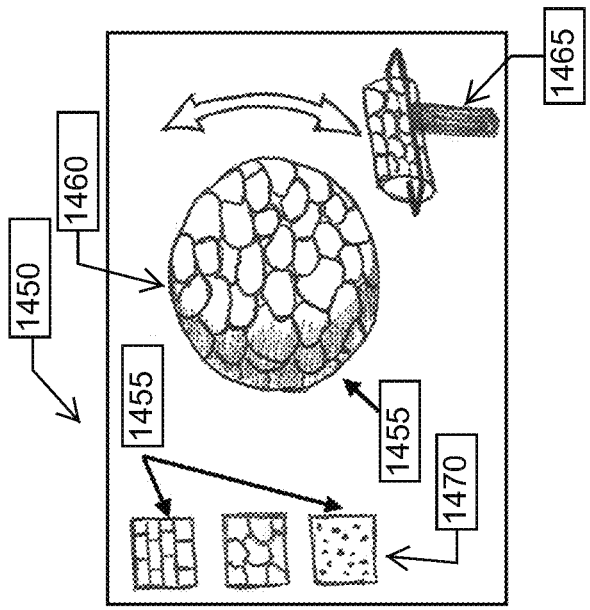
FIGS. 14A-14B show examples of pattern and texture application over virtual 3-D objects.
Figure 14A:
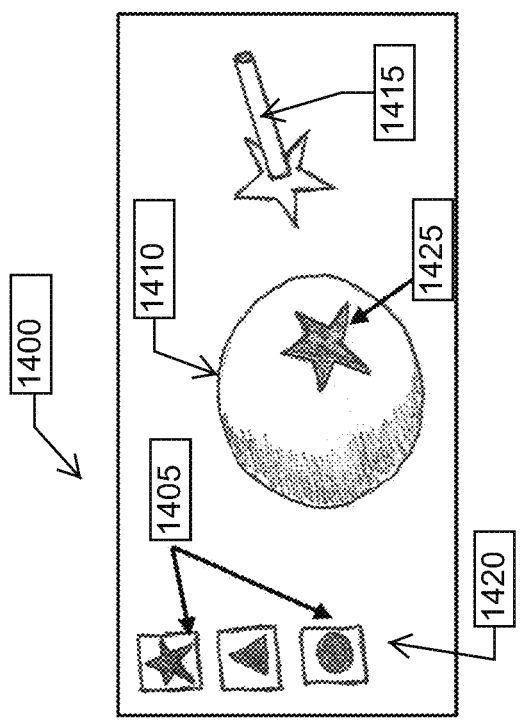

FIGS. 14A-14B show examples of modes of pattern and texture application over virtual 3-D objects.

FIG. 14A shows an example of applying a pattern 1405 onto a virtual 3-D object 1410. The virtual patterning tool 1415 is controlled by a cylindrical proxy (not shown). The menu 1420 on the left contains a list of patterns 1405 that can be fixed to the free end of the virtual patterning tool 1415. An example imprinted pattern 1425 is shown on the object 1410.

FIG. 14B shows another example of applying a pattern 1455 onto a virtual 3-D object 1460. A virtual roller 1465 is controlled by a cylindrical proxy (not shown). The virtual position of the virtual roller 1465 corresponds to the free end of the proxy. The menu 1470 on the left contains colors/textures 1455 available for use. The virtual roller 1465 can be applied over the entire surface of a 3-D model 1460 or over a specific user defined region thereof. Various aspects provide features for applying not color, or intricate details and patterns within the surface color. The physical proxy can have a simple geometry, but adding virtual tools to the simple geometry can extend its capabilities. For example, the pattern 1455 and the roller 1465 are virtually depicted at the free end of a cylindrical proxy. This way, users are not required to find a proxy that exactly matches the representation of the virtual modeling tool 1465.

Figure 15:
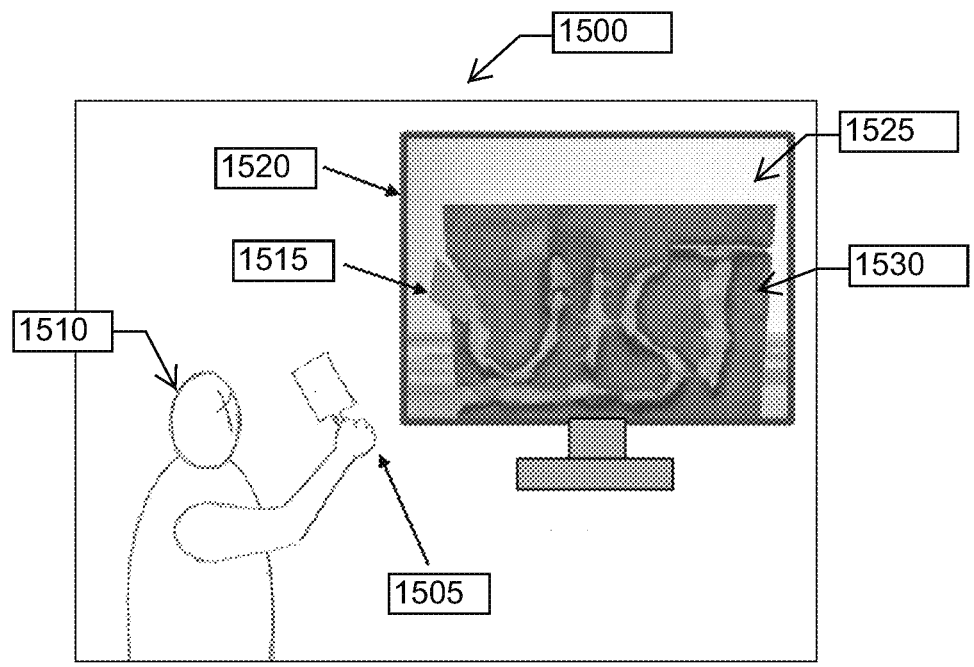
FIG. 15 shows an example of engraving text onto a virtual 3-D material.

FIG. 15 shows an example of engraving text onto a virtual 3-D material with a voxelized representation. Here, a planar shaped proxy 1505 is used by a user 1510 for controlling a virtual, flat carving tool 1515. Rendering 1520 is a graphical representation of an actual sculpted model that was created by a user via techniques according to various aspects herein. This and other examples permit free-form modeling in which the (e.g., planar) proxy 1505 controls a, e.g., flat cutting tool 1515 inside a virtual 3-D environment 1525. This virtual tool 1515 can be used to carve out shapes from or within a block of virtual material 1530. A voxelized model can be used to geometrically represent this virtual material 1530.

Tangible Possessions provides a direct way of defining the 3-D cutting paths of the tool. In the illustrated example, the letters "UIST" were carved by a user into a block of virtual material 1530. By moving the proxy 1505 to vary the contact area between the tool and the virtual material, users can also control the thickness of material removal along each cutting path. Various aspects permit users 1510 to simultaneously control and vary both the position and orientation of the cutting tool 1515 by moving the proxy 1505. This can permit intricate 3-D designs to be carved out in the virtual material 1530 along the cutting path. In addition, users 1510 can also employ subtle movements of the virtual cutting tool 1515, e.g., via movements of the proxy 1505, to incrementally etch out fine-level details within the virtual material 1530.

Various aspects provide a direct and physically plausible model for holding and manipulating virtual 3-D objects via proxies. Various aspects provide for virtual assembly of mechanical or architectural models using proxies. Various aspects permit constructing virtual assemblies by spatially combining smaller components. To enable precise configuration of these assemblies, the tangible interactions can be aided by a 3-D geometric constraint solver that automatically adjusts proximal components in a spatially compatible manner. The constraint solver can detect mutual spatial relationships between two or more assembly components, such as parallelism, perpendicularity, mating surfaces, concentricity, or axial alignment. Such constraint solving capabilities enable users to construct precise assemblies by approximately specifying the relative spatial configuration of the virtual components. In some examples, whenever two virtual components are brought into close proximity (e.g., by moving one or more proxies) in a way that meets specific geometric and spatial constraint thresholds, those virtual components can snap into appropriate positions relative to one another.

Figure 16:
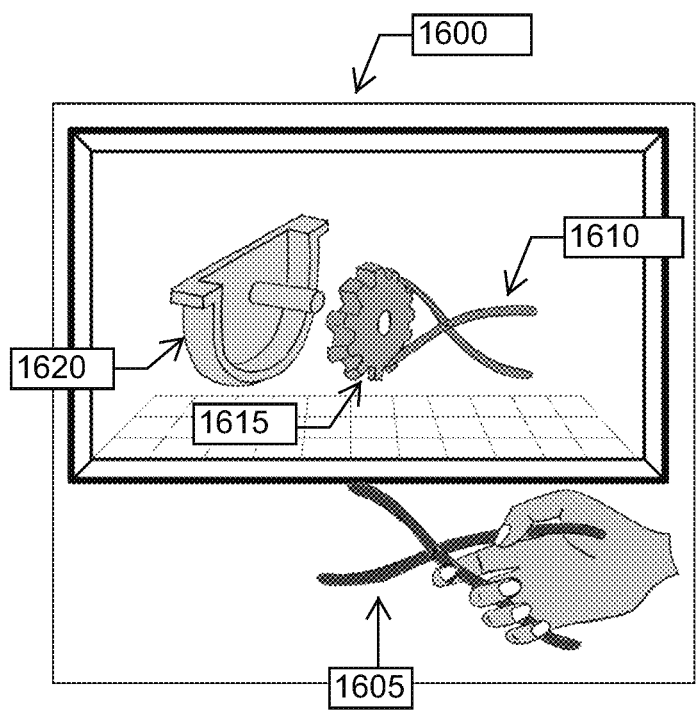
FIG. 16 shows an example of using a physical proxy to assemble virtual components together into an assembly.

FIG. 16 shows an example of using a physical proxy to assemble virtual components together into an assembly. Spatial and geometric constraints between adjoining components can be automatically identified by the central computational system. Thus users only need to specify the approximate spatial relationships between components in an assembly. Shown are proxy 1605, a pair of pliers or plier-like objects, virtual tool 1610 controlled by proxy 1605, virtual object 1615 virtually held by the virtual tool 1610, and virtual object 1620 to which virtual object 1615 is to be assembled.

Figure 17:
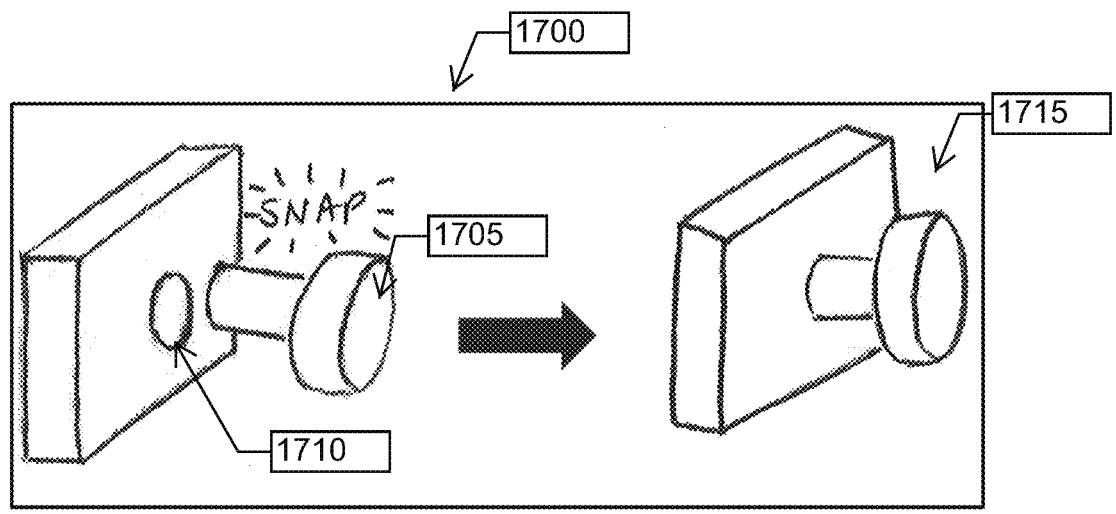
FIG. 17 shows an example of an automated snapping constraint.

FIG. 17 shows an example of an automated snapping constraint. Here, two virtual components (bolt 1705 and hole 1710) are brought into close proximity, e.g., by moving bolt 1705 or hole 1710 using a proxy (not shown) as described above. The system identifies the possible assembly relationship between bolt 1705 and hole 1710 and infers the proximity as a user-intended modeling action. The bolt 1705 automatically snaps into the hole 1710 (view 1715). This permits assembling the bolt and the hole, where a user only brings the bolt 1705 close to the hole 1710. Upon doing so, the system recognizes the user's intent and precisely places the bolt 1705 inside the hole 1710. The virtual components used in the assembly can be, e.g., pre-existing (created from any shape modeling media) or created using the herein-Described shape modeling approaches.

Figure 18:
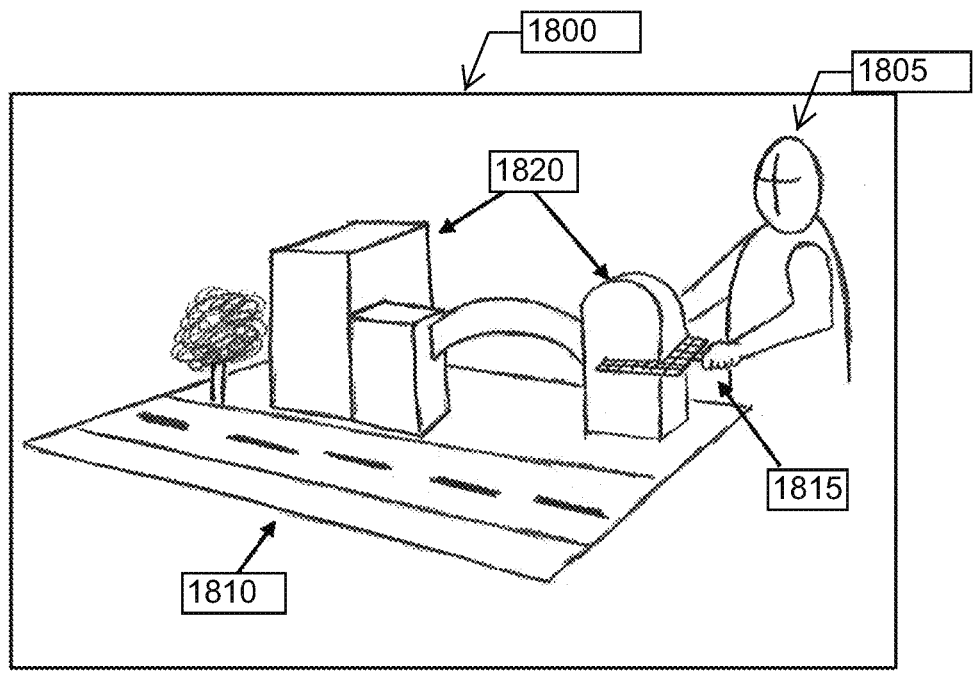
FIG. 18 shows an example of a 3-D scene.

FIG. 18 shows an example of a user 1805 laying out a 3-D scene 1810, e.g., within the context of architectural modeling. Physical proxies 1815 are used to hold, manipulate, and configure the components 1820 of the scene 1810 within appropriate locations. Context aware constraint solving capabilities enable precise geometric and spatial configuration of the components 1820. In this example, the display of the virtual scene 1810 is over a tabletop surface and is powered by stereoscopic display or an augmented reality glasses based display system (not shown).

Assembly techniques described herein can be extended to macro-assemblies. An entire scene can be created by collectively combing a set of complex geometric structures. As shown, a user 1805 can leverage Tangible Possessions to hold, manipulate and configure the individual components 1820 of the 3-D scene 1810. In this example, the scene pertains to an architectural model including buildings, archways, greenery, and road structures. The 3-D scene 1810 is rendered over a physical tabletop, e.g., using stereoscopic displays or augmented reality glasses. This mode of rendering enables users 1805 to directly interact with the content of the scene 1810 since the virtual environment and the physical workspace are overlapped within the same visual space.

Figure 19A:
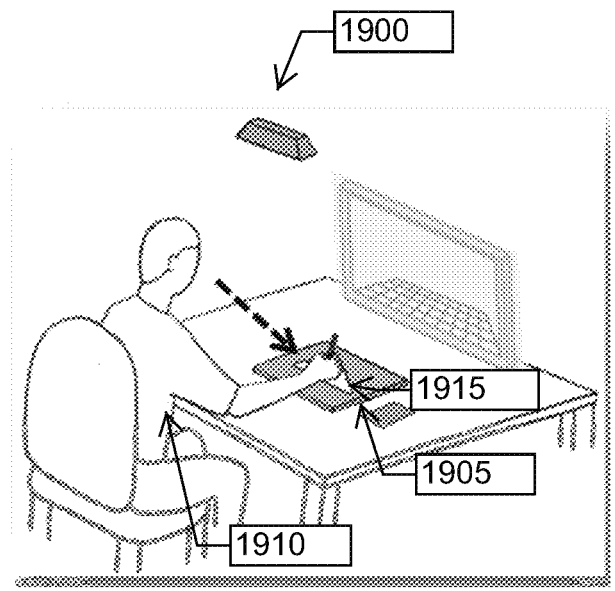
FIGS. 19A-19B show an example 3-D design prototyping interface.
Figure 19B:
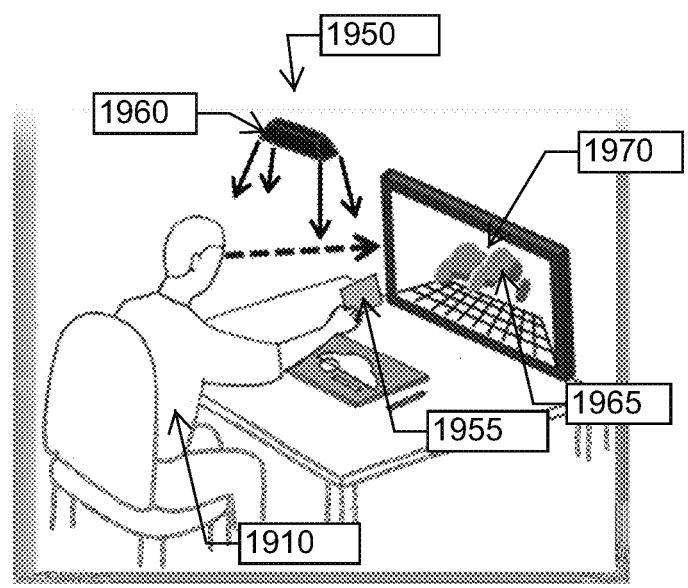

FIGS. 19A-19B show an example 3-D design prototyping interface where 3-D design prototypes can be provided by assembling planar components. Tangible Possessions provides a way of holding, manipulating and configuring the planar components in 3-D space.

FIG. 19A shows planar components created in a sketch medium. A digital sketch device 1905 permits users 1910 to create planar components 1915.

FIG. 19B shows a planar proxy 1955 used to spatially control the planar components during assembly. A depth sensor 1960 is used to detect the planar proxy. Using Tangible Possessions, users can pick up the virtual planar components 1965 and configure these components 1965 into 3-D objects 1970. In this example, a planar shaped proxy's 1955 spatial movement is directly mapped to a selected planar component 1965, such that users 1910 get the impression of manipulating the component 1965 by directly holding its outer edge.

In some aspects, while creating the 3-D objects 1970, users only need to approximately define the general structure of the object. The system can automatically infer and apply relations such as perpendicularity, parallelism, and alignment between the planar components 1965. This permits users to conveniently and frequently modify their design prototypes, they can explore multiple possibilities in a quick and efficient manner. The 3-D models 1970 created with this application are thus intrinsically structured, making them compatible with various physical fabrication processes. Various examples can permit users to perform advanced virtual tasks such as mechanical assembly, product dissection, and scene creation.

Figure 20:
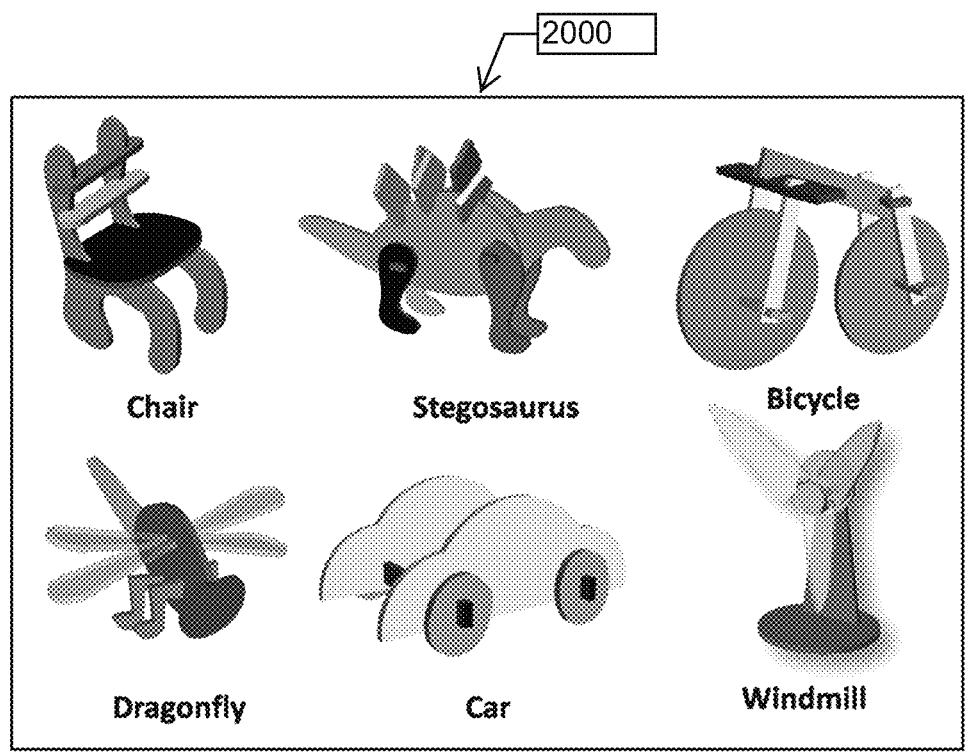
FIG. 20 shows example 3-D design prototypes.

FIG. 20 shows example 3-D design prototypes created using various aspects. Playful, as well as utilitarian, objects can be created using techniques and systems herein. Various aspects permit designers to quickly abstract out their design ideas in 3-D and possibly refine the idea before moving towards a more structured design of the finalized concept. When a 3-D prototype is finalized, the application can automatically construct notch joints between adjoining components. These jointed components can be fabricated using a laser cutter and assembled on the fly.

Figure 21:
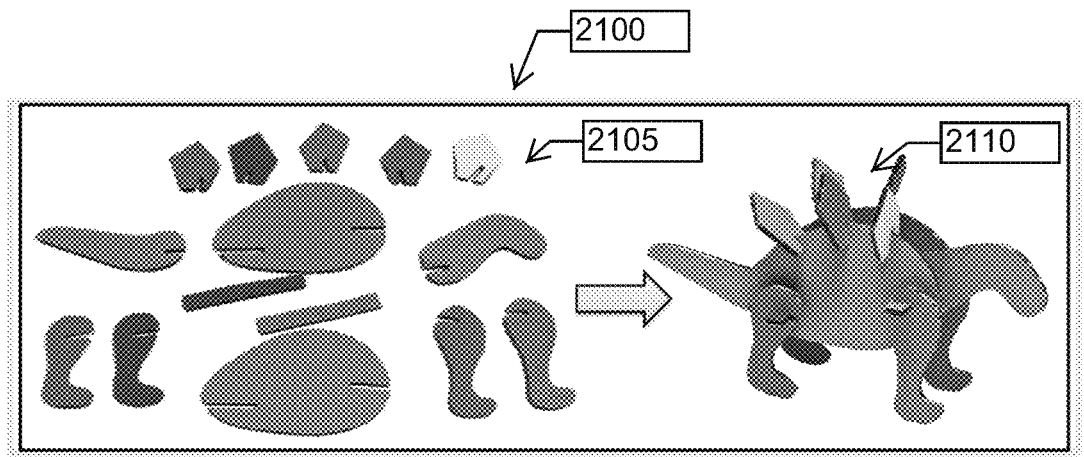
FIG. 21 shows a graphical representation of a photograph of example components of a 3-D design prototype.

FIG. 21 shows a graphical representation of a photograph of example components of a 3-D design prototype (Stegosaurus) that was created using techniques described herein and that was physically fabricated. The joint creation functionality identified regions where a notch joint needed to be inserted such that two adjoining components could be connected without any external fasteners. The individual laser cut parts 2105 are laid out on the left while the assembled physical prototype 2110 is displayed on the right. The components 2105 were created by laser cutting a sheet of corrugated cardboard. Colored paper was pasted over each component 2105. Various aspects permit designers to rapidly iterate over multiple ideas and concepts within the virtual environment before physical fabrication. In various aspects, the physical fabrication is low cost and thus can permit multiple iterations and redesigns of a design concept.

Various aspects described herein provide proxies that can be used as (e.g., can be used to control virtual) measurement and dimensioning tools ("tangible instruments") such as rulers, compass, protractors, set-squares, tape-measures and calipers. These physical proxies that represent these tools can be constructed by combining simple geometric primitives together into a meaningful structure that in a simplistic manner represents the actual tool itself. In some examples, the motion-tracking system uses template-based depth image matching techniques to extract a tool's geometric features that define its measurement parameters. These parameters can be mapped to the virtual environment in an analogous manner for measuring virtual objects.

In some examples, the geometric features are specific regions within a depth image that correspond to properties of interest. A template is a predefined geometric model, e.g., stored in a database, that allows the system to understand what such features look like and how they might appear in the image. When a physical proxy, e.g., corresponding to a tangible instrument is being tracked, it can have specific geometric features (e.g. prongs of a caliper or the circular lens region of a magnifying glass), whose position and orientation relative to the proxy need to be estimated. Template based matching techniques permit tracking such features. Some examples of such techniques that can be used with various aspects include RANSAC (Random Sample Consensus), ICP (Iterative Closest Point), Corner/Ridge/Edge/Surface Detection, and SIFT (Scale Invariant Feature Transform).

Figure 22:
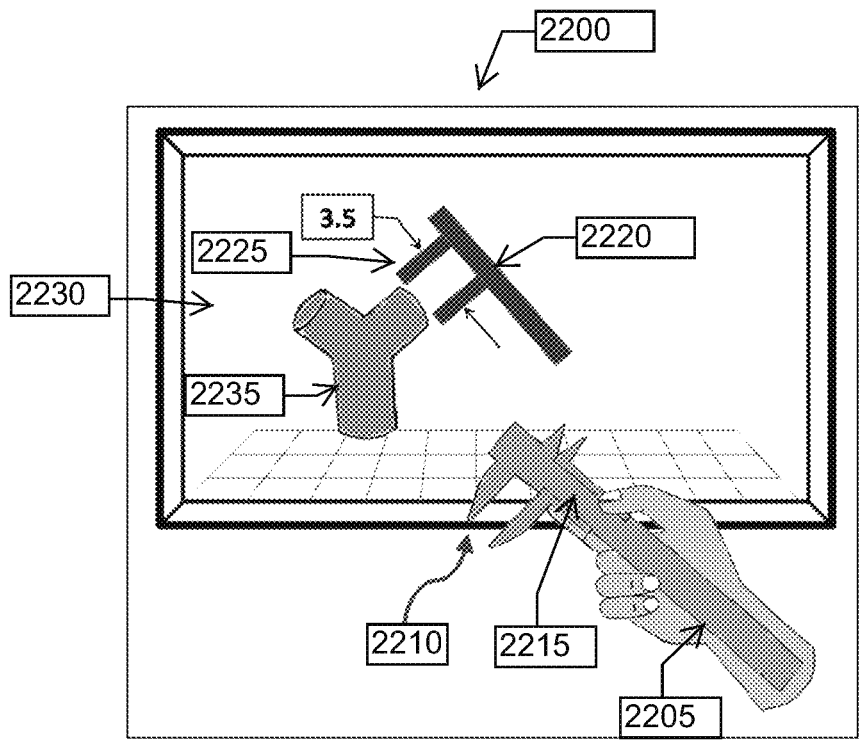
FIG. 22 shows an example of a virtual measuring tool.

FIG. 22 shows an example of a caliper-like proxy 2205 used for measuring a linear dimension by using the spacing between its jaws 2210 as the physical reference. The jaws 2210 can be moved along the ruler 2215 of the caliper. This movement can be mapped into the virtual tool 2220 counterpart of the proxy caliper 2205. Using this method, linear dimensions 2225 in the virtual 3-D environment 2230 can be measured on the features of virtual objects 2235 using the virtual caliper tool 2220. The same approach can be utilized to measure other forms of virtual dimensions such as radial angles using protractors, spherical distances using micrometers, or arc lengths using compasses. Various examples use proxies having measurement features (e.g., the jaws 2210 of the caliper proxy 2205) within the resolution bounds of low-fidelity depth sensors or other sensing devices used to detect the position and orientation of the proxies (e.g., FIG. 19B sensor 1960), permitting detection of those measurement features. In various aspects, a set of physical calipers constructed out of simple physical shapes serves as a proxy 2205 for controlling both the spatial movement of the virtual caliper 2220 and the separation of the jaws of the virtual caliper 2220. The vision based tracking system maps the distance between the tips of the jaws into the virtual space 2230. Using such mapping, dimensions of features of virtual objects 2235 can be measured.

Figure 24A:
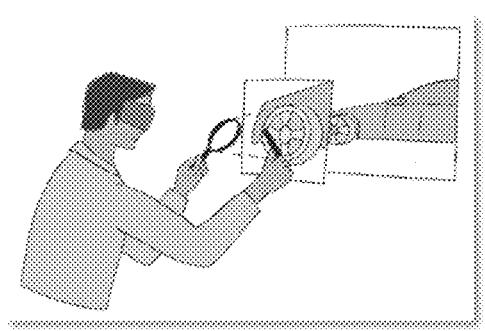
FIG. 24A shows an example in which a proxy can permit observing a specific region on a 3-D model at different scales of visibility.

Functional metaphors enable these proxies to perform higher level functionalities during 3-D design prototyping and modeling. FIG. 24A shows an example in which a proxy can permit observing a specific region on a 3-D model at different scales of visibility. This enables both global and local level modeling operations without significantly varying users' range of motion within the interaction space. For example, a planar proxy can be used to control a magnification tool that increases the scale of the region it is held over.

Figure 24B:
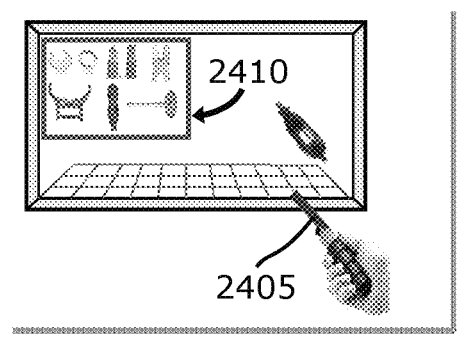
FIG. 24B shows an example in which a single proxy can be successively associated with different virtual modeling tools.

FIG. 24B shows an example in which a single proxy 2405 can be successively associated with different virtual modeling tools 2410. Each tool can vary the proxy's functionalities within the modeling space. For example, a cylindrical proxy can have its free-end associated with sculpting, coloring, molding, or tools that produce different effects on a 3-D model.

While facilitating shape-modeling activities in design, various aspects also provide advantages that can extend the capabilities of designers.

Figure 23:
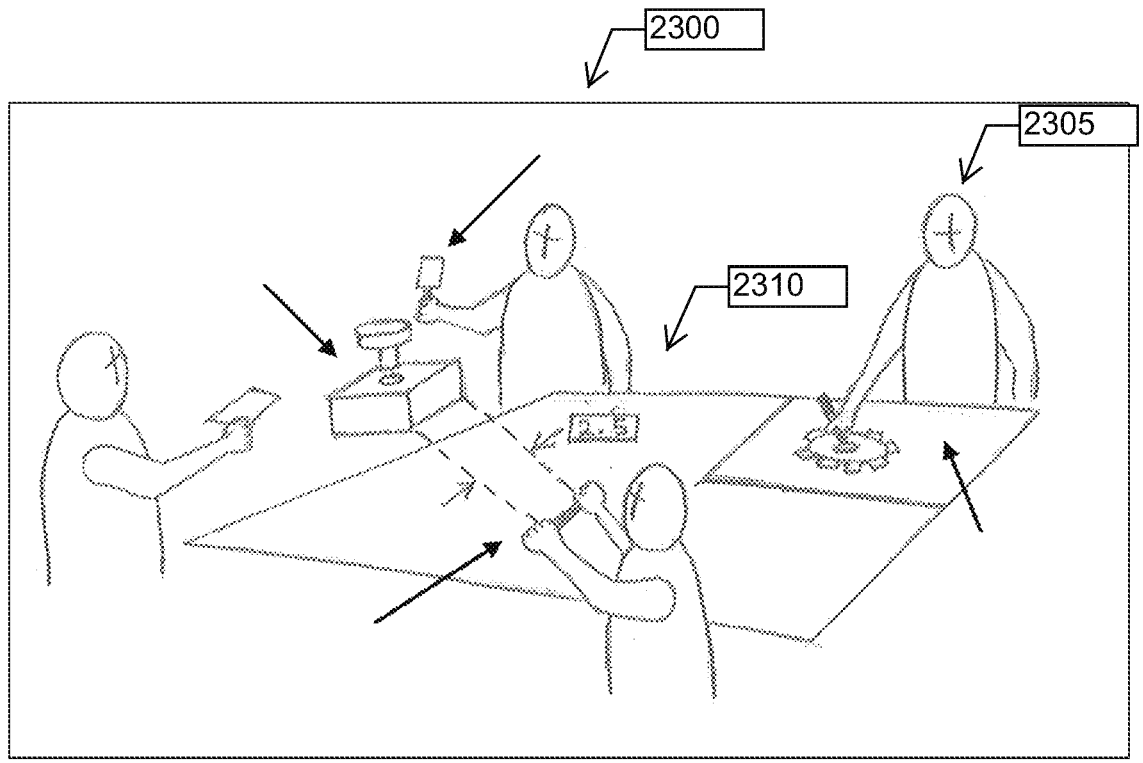
FIG. 23 shows an example of a collaborative design environment.

FIG. 23 shows an example of a collaborative design environment in which physical proxies are a mode of interactions. Multiple users 2305 can work on different aspects of the same design 2310 in a non-intrusive manner. This can permit multiple designers in a team to simultaneously and seamlessly work on a single design task, e.g., for creative collaborations. Various aspects permit concurrent tracking of multiple physical proxies and thus facilitate different modeling operations to occur together. Various aspects provide a collaborative design environment in which tangible interactions serve as primary input modalities for shape-modeling. Various example collaborative virtual environments can also include multi-touch and pen-based 2-D interfaces that can track 2-D gestures on, e.g., up to 10 different hands, handedness, and touch interactions of fingers. Various example environments can permit collaborative design via verbal communications, collective design ideation, iterative design prototyping, and unanimous design evaluation.

In the illustrated example, the design components and the working environment lie in the virtual domain. In some aspects, the individual members of a collaborative effort can be spatially separated or dispersed. Various aspects permit collaborative tasks to be performed by users who are distantly located, e.g., via real-time or near-real-time data communication. Various aspects support 3-D design applications or exploration of complex 3-D data acquired from, e.g., biology, linguistics, manufacturing, or architecture.

Various aspects use wearable augmented reality (AR) hardware to enable designers to directly view virtual 3-D shapes being modeled inside the physical environment they are working in (as opposed to traditional virtual reality systems, in which the user can only see the virtual 3-D environment). In some aspects, physical proxies are used as tools with specific functionalities for interacting with virtual shapes. Since the display of both the 3-D digital content and the physical tools are within the same spatial domain in these examples, virtual designs can be constructed on a real-world scale with physically plausible actions that directly imply modeling operations. Various aspects can significantly reduce cognitive load because users can directly observe the modeling tasks in the same physical domain in which their hands and modeling tools are operating. This can permit shape-modeling experiences to be performed in a way closer to users' real world experience. Various aspects use METAPro™. Besides providing AR display, these glasses also include a light-weight and short-range depth sensor (SoftKinetic™ Depthsense™) that facilitates 3-D data acquisition of the space in front of the user. This enables the system to track the physical proxies and other relevant physical information based on the perspective of the user in various aspects.

Various aspects provide a spatial input modality by which users can pick up an ordinary physical object and use it as a proxy (physical counterpart) to directly interact with virtual 3-D objects. By holding and expressively moving these proxies around in mid-air, novice users can create, modify, and spatially manipulate not only the virtual 3-D objects but also the virtual tools used for modeling them. In various examples, the proxies contain no external addendums (e.g., electronic sensors, fiducial markers etc.) and are tracked using a non-intrusive vision based sensor. The structural simplicity of the physical proxies makes them easy to track using low-fidelity sensors and geometry processing algorithms. In addition, their commonality makes them easily acquirable.

Various aspects use non-instrumented physical proxies to hold, manipulate, and spatially configure virtual 3-D objects. This permits users to spatially control virtual 3-D objects through a non-instrumented physical proxy.

Various aspects relate to direct possession of virtual 3-D objects. A virtual counterpart of a hand-held proxy can be attached to a virtual object such that the proxy's spatial movement gets directly transferred to the virtual object, giving users spatial control over the object. This can permit, e.g.: Spatially controlling virtual 3-D objects using non-instrumented proxies with primitive geometries (e.g., cylinders, planes, cubes, spheres); using metaphors (physical actions) for spatially associating a physical proxy to a virtual 3-D object through a virtual counterpart of the proxy; and using metaphors for clutching and releasing virtual 3-D objects using the physical proxies. e.g., tapping, scooping, piercing, or shaking.

Various aspects relate to functional possession of virtual 3-D objects. The physical proxies are associated with functionalities for grasping and holding 3-D objects. This functionality can be applied on virtual 3-D objects for spatially controlling them. This can permit, e.g.: use of ordinary objects with intrinsic grasping or holding functionalities (e.g., tongs, pincers, vise-grips, skewers, ladles, or spatulas) for possessing and spatially controlling virtual 3-D shapes (these objects can be non-instrumented and can be tracked by a depth sensor); and possessing and spatially manipulating multiple virtual 3-D shapes by exploiting a functional proxy's (e.g., skewer or ladle) ability to hold several objects at the same time.

Constrained manipulation during use of Tangible Possessions. Spatially controlling a virtual 3-D object along a precise direction such that its movement is constrained to a specific user-defined degree of freedom at a given time. This can permit, e.g., using the physical proxy to define the 3-D direction along which a virtual 3-D object can be translated or rotated in a constrained manner.

Various aspects use non-instrumented physical proxies to create, model and modify virtual 3-D shapes. Tangible Possessions techniques described herein permit interactive modeling of virtual 3-D shapes using natural human actions and the perceptual affordances of the physical proxies. Users can directly create and modify virtual shapes to express design ideas in a manner similar to the process of physical design construction. The virtual environment is used to extend the capabilities of the both the use and the proxies used for modeling the shapes.

Various aspects use tangible interactions to create 3-D swept volumes. 2-D profiles are anchored onto a planar proxy such that its motion defines the structure of a virtual 3-D swept volume. Example swept volumes include: Free-form swept volumes attained by freely moving a proxy containing a 2-D profile in 3-D space or constrained sweep geometry within physical bounds in 3-D space. Example constraints include: Defining the sweep trajectory by directly sketching a 3-D curve using a stylus like proxy; sketching a planar trajectory on a 2-D sketch medium and using a physical proxy to spatially configure it in 3-D space; and defining a 3-D region within which sweep volumes can be created.

Various examples permit creating variable section sweeps using a physical proxy. This can be done by, e.g., placing varyingly shaped profiles at different locations of the sketched 3-D trajectory; or using metaphors (e.g., shaking, voice-commands etc.) for scrolling across different planar profiles from a pre-defined repository during free-form sweep creation.

Various aspects permit using a physical proxy to create a complex 3-D design by incrementally adding swept volume components to the overall body of the design model.

Various aspects use tangible interactions to created structured 3-D shapes by combining 3-D primitives through Boolean operations. The physical proxies are used to spatially configure pre-defined virtual 3-D shapes. These shapes are incrementally included into the overall virtual design through additive or subtractive Boolean operations. The individual components can be pre-defined 3-D primitives or from swept volumes created in the aforementioned applications.

Various aspects use tangible interactions for virtual 3-D sculpting and multi-resolution detailing. The physical proxies are used to spatially control virtual sculpting tools. These tools can provide interactive sculpting operations on a lump of virtual material represented either as a voxelized model or a mesh based surface model. This can permit, e.g.: Tangible interactions for sculpting a voxelized representation by adding or removing individual voxels. Multi-level of detail can be attained by varying the voxel resolution across the 3-D model; using tangible interactions for global and local deformation for sculpting 3-D mesh models using physically plausible metaphors (e.g., stretching, pulling, rolling, slicing, bending, or molding). Tangible interactions for applying external aesthetic attributes on sculpted models or other 3-D design models (e.g., using a Patterning tool to imprint patterns onto the surface of a 3-D model using a cylindrical proxy, or using a texturing tool to apply uniform colors or complex textures on 3-D models by using a paint roller metaphor); or sculpting voxelized 3-D models using a planar proxy that controls a flat virtual cutting tool. Various aspects use proxies providing affordances for motion. E.g., a planar proxy can afford holding an object or providing a direction or surface along which to slide a virtual object in a constrained manner (e.g., a tabletop). Various aspects use proxies providing functional affordances, e.g., by moving as a particular virtual tool does. For example, objects can slide along a plane or cylinder, so proxies of those shapes can afford sliding motions of virtual objects. Each virtual object and corresponding proxy can provide corresponding motion constraints. In an example, a user can hold a cylinder with a hole in one hand and a smaller-Diameter cylinder in the other. These proxies afford moving the smaller-Diameter cylinder in and out of the hole, naturally permitting controlling relative motion of two virtual objects with respect to each other. In another example, a user can hold a sleeve in one hand and a cylinder (that fits through the sleeve) in the other hand. Moving the cylinder through the sleeve can correspond to motion of, e.g., a virtual drill.

Various aspects use tangible interactions for assembling virtual 3-D components into a cohesive design model. Tangible Possession can be utilized to spatially configure individual components of a virtual assembly. Various aspects provide Tangible interactions for assembly of virtual 3-D components across diverse domains (e.g., mechanical design, architectural modeling, educational tools etc.). Various aspects provide automated 3-D constraint recognition based on intentional user defined proximity between components. Various aspects provide Tangible interactions for assembly of macro-structures (e.g., architectural planning, landscape development, virtual scene creation in multimedia etc.). Various aspects provide Integration of tangible interactions with a tabletop display using stereoscopic or augmented reality rendering for direct 3-D interactions during assembly. Various aspects provide 3-D representations of ideated design concepts by assembly of planar components. A planar proxy can be used to spatially manipulate and configure the components. In some examples, a user can hold two proxies, one that controls view and one that manipulates virtual objects. For example, one proxy can control a virtual magnifying glass used to control a zoom or magnification level or camera position of the virtual environment.

Various aspects use physical representations of real-world instruments to perform measurement, dimensioning, and metaphorical tasks on virtual 3-D objects. The proxies provide functional metaphors for measuring dimensions along specific features of a virtual 3-D object. The proxies as well as their physical measurement features are tracked by a depth sensor and mapped analogously into the virtual environment. These tools also provide metaphors for extending user's capabilities inside the virtual environment.

Various aspects use physical proxies with measurement functionalities. (e.g., Calipers, micrometers, compass, rulers, set-squares, tape measures, or protractors) Various aspects use physical proxies with metaphorical functionalities, e.g., magnifying glass (e.g., FIG. 24A), multi-purpose tool set (e.g., FIG. 24B), or skewer.

Various aspects provide a collaborative design environment that uses interactions with physical proxies as the primary modality for virtual 3-D and interpersonal interactions. Members of a design team can collaboratively work towards the development of a common design concept from both co-located and distant-located settings. In various aspects, two different users can see the same view of the virtual environment or can see different views, e.g., opposite sides of a single virtual object. For example, non-collocated users can see the same view and collocated users can see respective, different views (e.g., FIG. 23).

Various aspects provide integrated multi-user design space including a common design environment that facilitates both 2-D multi-touch and pen based interactions along with spatial interactions with 3-D digital content.

Various aspects provide collaborative virtual design space for both co-located and distant-located physical work settings. The members of the collaborative effort are not required to be present in the same physical setting. The virtual components of the design activity can be accessed by each member at real-time.

Various aspects provide collaborative exploration of virtual data that represent both physical as well as abstract information. Analysis of complex 3-D data sometimes involves inspection by multiple individuals. Collaborative interfaces described herein permit visualization, and interpersonal, and 3-D interaction perspectives during data analysis.

Steps of various methods described herein can be performed in any order except when otherwise specified, or when data from an earlier step is used in a later step. Exemplary method(s) described herein are not limited to being carried out by components particularly identified in discussions of those methods.

In view of the foregoing, some aspects provide measurement of position and orientation of non-instrumented physical proxies. A technical effect is to improve user efficiency of moving and controlling virtual objects and tools by providing the ability to perform such moving and controlling using the non-instrumented physical proxies. A further technical effect is to present visual representations of virtual tools and objects on an electronic display.

Figure 25:
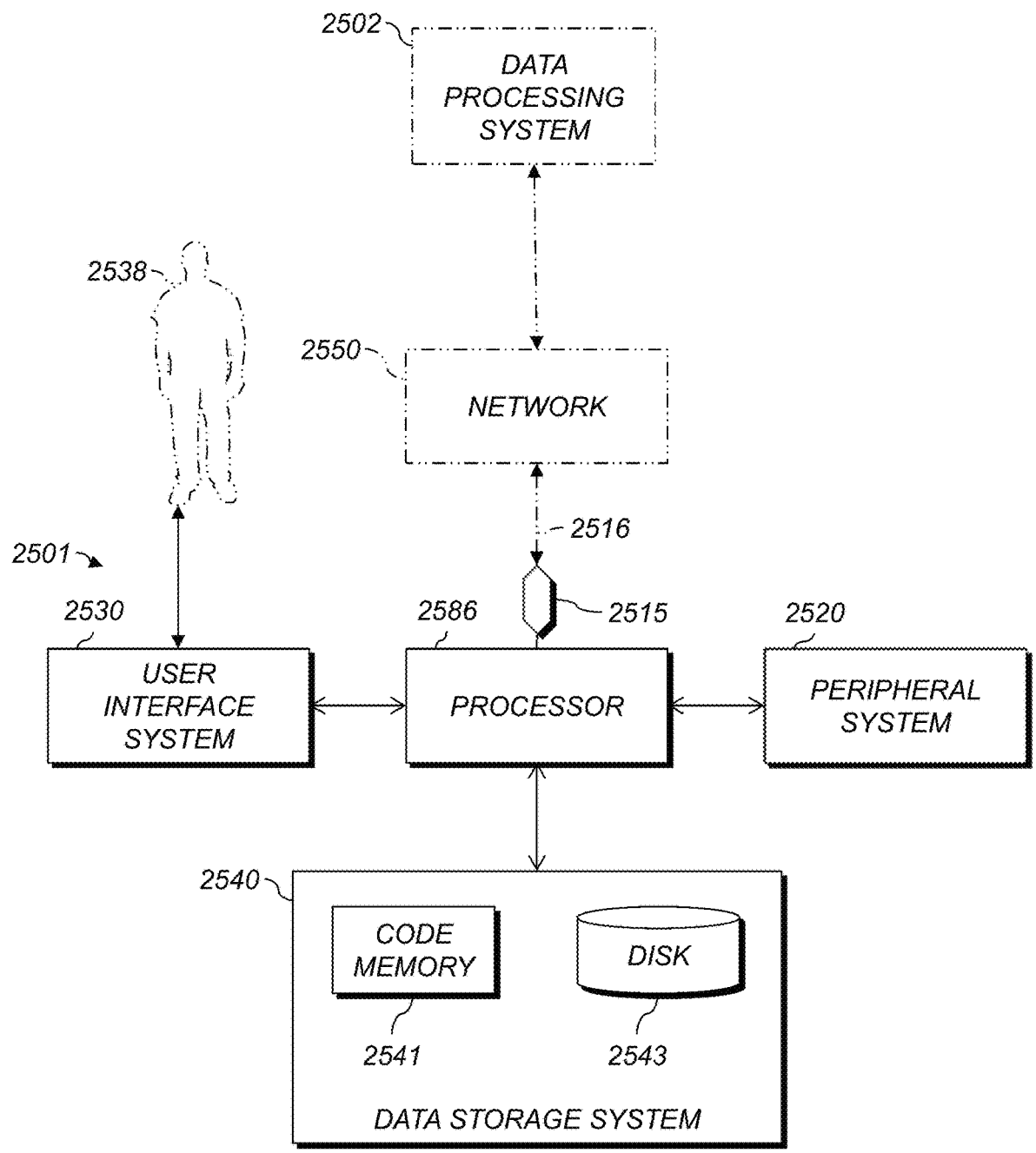
FIG. 25 is a high-level diagram showing the components of an exemplary data-processing system.

FIG. 25 is a high-level diagram showing the components of an exemplary data-processing system 2501 for analyzing data and performing other analyses described herein, and related components. The system 2501 includes a processor 2586, a peripheral system 2520, a user interface system 2530, and a data storage system 2540. The peripheral system 2520, the user interface system 2530 and the data storage system 2540 are communicatively connected to the processor 2586. Processor 2586 can be communicatively connected to network 2550 (shown in phantom), e.g., the Internet or a leased line, as discussed below. Devices 210, 215, 220, and 225 (FIG. 2) and 1950 (FIG. 19B), and other cameras and controllers of virtual environments described herein, can each include one or more of systems 2586, 2520, 2530, 2540, and can each connect to one or more network(s)

2550. Processor 2586, and other processing devices described herein, can each include one or more microprocessors, microcontrollers, field-programmable gate arrays (FPGAs), application-specific integrated circuits (ASICs), programmable logic devices (PLDs), programmable logic arrays (PLAs), programmable array logic devices (PALs), or digital signal processors (DSPs).

Processor 2586 can implement processes of some aspects described herein. Processor 2586 and related components can, e.g., carry out processes for manipulating virtual objects and tools such as those discussed above with reference to FIGS. 1 and 4A-24B.

Processor 2586 can be or include one or more device(s) for automatically operating on data, e.g., a central processing unit (CPU), microcontroller (MCU), desktop computer, laptop computer, mainframe computer, personal digital assistant, digital camera, cellular phone, smartphone, or any other device for processing data, managing data, or handling data, whether implemented with electrical, magnetic, optical, biological components, or otherwise.

The phrase "communicatively connected" includes any type of connection, wired or wireless, for communicating data between devices or processors. These devices or processors can be located in physical proximity or not. For example, subsystems such as peripheral system 2520, user interface system 2530, and data storage system 2540 are shown separately from the data processing system 2586 but can be stored completely or partially within the data processing system 2586.

The peripheral system 2520 can include or be communicatively connected with one or more devices configured or otherwise adapted to provide digital content records to the processor 2586 or to take action in response to processor 186. For example, the peripheral system 2520 can include digital still cameras, digital video cameras, cellular phones, or other data processors. The processor 2586, upon receipt of digital content records from a device in the peripheral system 2520, can store such digital content records in the data storage system 2540.

The user interface system 2530 can convey information in either direction, or in both directions, between a user 2538 and the processor 2586 or other components of system 2501. The user interface system 2530 can include a mouse, a keyboard, another computer (connected, e.g., via a network or a null-modem cable), or any device or combination of devices from which data is input to the processor 2586. The user interface system 2530 also can include a display device, a processor-accessible memory, or any device or combination of devices to which data is output by the processor 2586. The user interface system 2530 and the data storage system 2540 can share a processor-accessible memory.

In some aspects, processor 2586 includes or is connected to communication interface 2515 that is coupled via network link 2516 (shown in phantom) to network 2550. For example, communication interface 2515 can include an integrated services digital network (ISDN) terminal adapter or a modem to communicate data via a telephone line; a network interface to communicate data via a local-area network (LAN), e.g., an Ethernet LAN, or wide-area network (WAN); or a radio to communicate data via a wireless link, e.g., WIFI or GSM. Communication interface 2515 sends and receives electrical, electromagnetic or optical signals that carry digital or analog data streams representing various types of information across network link 2516 to network 2550. Network link 2516 can be connected to network 2550 via a switch, gateway, hub, router, or other networking device.

In some aspects, system 2501 can communicate, e.g., via network 2550, with a data processing system 2502, which can include the same types of components as system 2501 but is not required to be identical thereto. Systems 2501, 2502 are communicatively connected via the network 2550. Each system 2501, 2502 executes computer program instructions to manipulate virtual objects in response to non-instrumented physical proxies as described herein.

Processor 2586 can send messages and receive data, including program code, through network 2550, network link 2516 and communication interface 2515. For example, a server can store requested code for an application program (e.g., a JAVA applet) on a tangible non-volatile computer-readable storage medium to which it is connected. The server can retrieve the code from the medium and transmit it through network 2550 to communication interface 2515. The received code can be executed by processor 2586 as it is received, or stored in data storage system 2540 for later execution.

Data storage system 2540 can include or be communicatively connected with one or more processor-accessible memories configured or otherwise adapted to store information. The memories can be, e.g., within a chassis or as parts of a distributed system. The phrase "processor-accessible memory" is intended to include any data storage device to or from which processor 2586 can transfer data (using appropriate components of peripheral system 2520), whether volatile or nonvolatile; removable or fixed; electronic, magnetic, optical, chemical, mechanical, or otherwise. Exemplary processor-accessible memories include but are not limited to: registers, floppy disks, hard disks, tapes, bar codes, Compact Discs, DVDs, read-only memories (ROM), erasable programmable read-only memories (EPROM, EEPROM, or Flash), and random-access memories (RAMs). One of the processor-accessible memories in the data storage system 2540 can be a tangible non-transitory computer-readable storage medium, i.e., a non-transitory device or article of manufacture that participates in storing instructions that can be provided to processor 2586 for execution.

In an example, data storage system 2540 includes code memory 2541, e.g., a RAM, and disk 2543, e.g., a tangible computer-readable rotational storage device or medium such as a hard drive. Computer program instructions are read into code memory 2541 from disk 2543. Processor 2586 then executes one or more sequences of the computer program instructions loaded into code memory 2541, as a result performing process steps described herein. In this way, processor 2586 carries out a computer implemented process. For example, steps of methods described herein, blocks of the flowchart illustrations or block diagrams herein, and combinations of those, can be implemented by computer program instructions. Code memory 2541 can also store data, or can store only code.

Some aspects described herein may be embodied as systems or methods. Accordingly, some aspects herein may take the form of an entirely hardware aspect, an entirely software aspect (including firmware, resident software, micro-code, etc.), or an aspect combining software and hardware aspects These aspects can all generally be referred to herein as a "service," "circuit," "circuitry," "module," or "system."

Furthermore, some aspects herein may be embodied as computer program products including computer readable program code ("program code") stored on a computer readable medium, e.g., a tangible non-transitory computer storage medium or a communication medium. A computer storage medium can include tangible storage units such as volatile memory, nonvolatile memory, or other persistent or auxiliary computer storage media, removable and non-removable computer storage media implemented in any method or technology for storage of information such as computer-readable instructions, data structures, program modules, or other data. A computer storage medium can be manufactured as is conventional for such articles, e.g., by pressing a CD-ROM or electronically writing data into a Flash memory. In contrast to computer storage media, communication media may embody computer-readable instructions, data structures, program modules, or other data in a modulated data signal, such as a carrier wave or other transmission mechanism. As defined herein, computer storage media do not include communication media. That is, computer storage media do not include communications media consisting solely of a modulated data signal, a carrier wave, or a propagated signal, per se.

The program code includes computer program instructions that can be loaded into processor 2586 (and possibly also other processors), and that, when loaded into processor 2586, cause functions, acts, or operational steps of some aspects herein to be performed by processor 2586 (or other processor). Computer program code for carrying out operations for some aspects described herein may be written in any combination of one or more programming language(s), and can be loaded from disk 2543 into code memory 2541 for execution. The program code may execute, e.g., entirely on processor 2586, partly on processor 2586 and partly on a remote computer connected to network 2550, or entirely on the remote computer.

Example Clauses

A: A method of manipulating a three-dimensional image file including a virtual object, comprising: obtaining image information in a processing device of a tangible inanimate object manipulated by a user, such image information including movement information; causing virtual movement of the virtual object based on the movement information; and displaying the virtual movement of the virtual object on a display.

B: The method of paragraph A, wherein the processing device associates a shape of the tangible inanimate objection with a predetermined set of constrained movements, and wherein the processor causes the virtual movement of the virtual object within the predetermined set of constrained movements.

C: The method of paragraph A or B, wherein the tangible inanimate object is one of a block, a rod or a substantially planar object.

D: The method of any of paragraphs A-C, wherein the tangible inanimate object is grasping tool.

E: A method of generating a virtual object in a three-dimensional image file, comprising: obtaining image information in a processing device of a tangible inanimate object manipulated by a user, such image information including movement information; creating a shape of the virtual object based on the movement information; and displaying the creating of the shape of the virtual object on a display.

F: The method of paragraph E, wherein the movement information is based on and is representative of a sweep of the tangible inanimate object by the user, and wherein the processing device creates the shape to have a volume corresponding to the sweep.

G: The method of paragraph F, further comprising using the processing device to create the shape as a cross-sectional shape expanding along a path of the sweep.

H: The method of paragraph G, wherein the processing device creates the shape to have a uniform cross-section along the path of the sweep.

I: The method of paragraph G or H, further comprising: obtaining in the processor an additional input contemporaneous with, at least in part, the obtaining of the movement information representative of the sweep; varying the cross-sectional shape at a location along the path of the sweep corresponding in time to the receipt of the additional input.

J: The method of paragraph I, wherein the additional input comprises additional image information.

K: The method of paragraph I or J, wherein the additional input comprises audio information.

L: A method of modifying a virtual object in a three-dimensional image file, comprising: obtaining image information in a processing device of a tangible inanimate object manipulated by a user, such image information including movement information; altering a shape of the virtual object based on the movement information; and displaying the altering of the shape of virtual object on a display.

M: The method of paragraph L, wherein the processing devices associates a predetermine set of alteration capabilities with each of a plurality of tangible inanimate objects, and wherein the tangible inanimate object manipulated by the user has a first set of alteration capabilities.

N: The method of paragraph L or M, where the first set of alteration capabilities corresponds to sculpting the virtual object to alter the shape of the virtual object.

O: The method of any of paragraphs L-N, where the first set of alteration capabilities corresponds to slicing the virtual object to alter the shape of the virtual object.

P: The method of any of paragraphs L-O, where the first set of alteration capabilities corresponds to locally deforming or stretching the virtual object to alter the shape of the virtual object.

Q. A method of modifying a virtual object in a three-dimensional image file, comprising: obtaining image information in a processing device of a tangible inanimate object manipulated by a user, such image information including movement information; altering a color of at least a part of the virtual object based on the movement information; and displaying the altering of the color of the virtual object on a display.

R: A method, comprising: obtaining first image information in a processing device of a first tangible inanimate object manipulated by a user, such first image information including first movement information; causing virtual movement of a virtual object in a three-dimensional image file based on the first movement information; displaying the virtual movement of the virtual object on a display; updating position and orientation information associated with the virtual object based on the virtual movement; obtaining second image information in a processing device of a second tangible inanimate object manipulated by the user or another user, such second image information including second movement information; altering a shape of the virtual object based on the second movement information and the updated position and orientation information; and displaying the altering of the shape of virtual object on a display.

S: A method of manipulating a three-dimensional image file including a virtual object, comprising: obtaining image information in a processing device of a non-instrumented physical object manipulated by a user, such image information including movement information; and causing virtual movement of the virtual object based on the movement information.

T: The method according to paragraph S, wherein the processing device associates a shape of the non-instrumented physical object with a predetermined set of constrained movements, and wherein the processor causes the virtual movement of the virtual object within the predetermined set of constrained movements.

U: The method according to paragraph S or T, wherein the non-instrumented physical object is one of a block, a rod or a substantially planar object.

V: The method according to any of paragraphs S-U, wherein the non-instrumented physical object is grasping tool.

W: The method according to any of paragraphs S-V, further including: updating position and orientation information associated with the virtual object based on the virtual movement; obtaining second image information in a processing device of a second non-instrumented physical object manipulated by the user or another user, such second image information including second movement information; and altering a shape of the virtual object based on the second movement information and the updated position and orientation information.

X: The method according to any of paragraphs S-W, further including: obtaining second image information in a processing device of a second non-instrumented physical object manipulated by the user or another user, such second image information including second movement information; causing virtual movement of a second virtual object based on the second movement information; detecting a relative virtual spatial relationship between the virtual object and the second virtual object satisfying a stored constraint; and, in response to detecting the relationship, causing virtual movement of the virtual object or the second virtual object (or both) into a second relative virtual spatial relationship associated with the stored constraint.

Y: The method according to any of paragraphs S-X, further including: determining a geometric parameter of the non-instrumented physical object based at least in part on the image information; altering a shape of the virtual object based at least in part on the determined geometric parameter; determining a virtual dimension corresponding to the altered shape of the virtual object; and optionally storing, displaying, or using in a computation the determined virtual dimension.

Z: A method of shaping a virtual object in a three-dimensional image file, comprising: obtaining image information in a processing device of a non-instrumented physical object manipulated by a user, such image information including movement information; and determining a shape of the virtual object based on the movement information.

AA: The method according to paragraph Z, wherein the movement information is based on and is representative of a sweep of the non-instrumented physical object by the user, and wherein the processing device determines the shape to have a volume corresponding to the sweep.

AB: The method according to paragraph AA, further comprising using the processing device to determine the shape as a cross-sectional shape expanding along a path of the sweep.

AC: The method according to paragraph AB, wherein the processing device determines the shape to have a uniform cross-section along the path of the sweep.

AD: The method according to paragraph AB or AC, further comprising: obtaining in the processor an additional input contemporaneous with, at least in part, the obtaining of the movement information representative of the sweep; varying a cross section of the shape at a location along the path of the sweep corresponding in time to the receipt of the additional input.

AE: The method according to any of paragraphs Z-AD, wherein the determining the shape of the virtual object includes altering an existing shape of the virtual object.

AF: The method according to paragraph AE, further including accessing, by the processing device, a predetermined set of alteration capabilities associated with the non-instrumented physical object manipulated by the user.

AG: The method according to paragraph AF, where the predetermined set of alteration capabilities corresponds to subtracting virtual material from the virtual object to alter the shape of the virtual object and the determining the shape includes adjusting boundary data of the virtual object to remove a portion of the virtual object based at least in part on the movement information.

AH: The method according to paragraph AG, where the movement information includes information of a slicing motion of the non-instrumented physical object and the determining the shape includes determining a portion of the virtual object to be removed based at least in part on a virtual trajectory of the slicing motion with respect to a virtual location of the virtual object.

AI: The method according to any of paragraphs AF-AH, where the predetermined set of alteration capabilities corresponds to locally deforming or stretching the virtual object to alter the shape of the virtual object and the determining the shape includes adjusting boundary data of the virtual object to deform the virtual object based at least in part on the movement information.

AJ: A method of modifying a virtual object in a three-dimensional image file, comprising: obtaining image information in a processing device of a non-instrumented physical object manipulated by a user, such image information including movement information; and altering a virtual surface appearance of at least a part of the virtual object based on the movement information.

AK: The method according to paragraph AJ, wherein the altering the surface appearance includes altering a color of the virtual object.

AL: The method according to paragraph AJ or AK, wherein the altering the surface appearance includes altering a texture of the virtual object.

AM: The method according to any of paragraphs S-Y, further including displaying the virtual movement of the virtual object on a display.

AN: The method according to any of paragraphs Z-AI, further including displaying the determined shape of the virtual object on a display.

AO: The method according to any of paragraphs AJ-AL, further including displaying the altered surface appearance of the virtual object on a display.

AP: The method according to any of paragraphs S-Y or AM, further including modifying the three-dimensional image file based at least in part on, corresponding to, or in response to, the virtual movement of the virtual object.

AQ: The method according to any of paragraphs Z-AI or AN, further including modifying the three-dimensional image file based at least in part on, corresponding to, or in response to, the determined shape of the virtual object.

AR: The method according to any of paragraphs AJ-AL or AO, further including modifying the three-dimensional image file based at least in part on, corresponding to, or in response to, the altered surface appearance of the virtual object.

AS: The method according to any of paragraphs S-AR, wherein the obtaining image information includes detecting the image information including the movement information using a sensor configured to detect the non-instrumented physical object manipulated by the user in a field of view of the sensor.

AT: The method according to paragraph AS, wherein the sensor includes one or more depth camera(s).

AU: The method according to paragraph AS or AT, wherein the sensor consists of one or more depth camera(s).

AV: The method according to any of paragraphs AS-AU, wherein the sensor consists of a single depth camera.

AW: The method according to paragraph AD, wherein the additional input comprises additional image information.

AX: The method according to paragraph AD, wherein the additional input comprises audio information.

AY: A computer-readable medium, e.g., a computer storage medium, having thereon computer-executable instructions, the computer-executable instructions upon execution configuring a computer to perform operations as any of paragraphs A-AX recite.

AZ: A device comprising: a processor; and a computer-readable medium, e.g., a computer storage medium, having thereon computer-executable instructions, the computer-executable instructions upon execution by the processor configuring the device to perform operations as any of paragraphs A-AX describe.

BA: A system comprising: means for processing; and means for storing having thereon computer-executable instructions, the computer-executable instructions including means to configure the device to carry out a method as any of paragraphs A-AX describe.

CONCLUSION

The invention is inclusive of combinations of the aspects described herein. References to "a particular aspect" (or "embodiment" or "version") and the like refer to features that are present in at least one aspect of the invention. Separate references to "an aspect" (or "embodiment") or "particular aspects" or the like do not necessarily refer to the same aspect or aspects; however, such aspects are not mutually exclusive, unless so indicated or as are readily apparent to one of skill in the art. The use of singular or plural in referring to "method" or "methods" and the like is not limiting. The word "or" is used in this disclosure in a non-exclusive sense, unless otherwise explicitly noted.

The invention has been described in detail with particular reference to certain preferred aspects thereof, but it will be understood that variations, combinations, and modifications can be effected by a person of ordinary skill in the art within the spirit and scope of the invention.

The invention claimed is:

1. A method of manipulating a three-dimensional image file including a virtual object, the method comprising:
obtaining, by a processing device, first image information of an environment comprising a non-instrumented physical object held and manipulated by a user;
identifying, by the processing device, a gesture in the first image information;
in response to identifying the gesture, recognizing, by the processing device, the non-instrumented physical object as a proxy;
in response to recognizing the non-instrumented physical object as the proxy, obtaining, by the processing device, second image information comprising movement information representing at least one movement of the non-instrumented physical object; and
causing virtual movement of the virtual object based on the movement information;
wherein the non-instrumented physical object omits fiducials, transponders, or other features specifically configured for detection by or communication with a computerized system.

2. The method according to claim 1, further comprising, by the processing device:
associating a shape of the non-instrumented physical object with a predetermined set of constrained movements; and
causing the virtual movement of the virtual object within the predetermined set of constrained movements.

3. The method according to claim 1, wherein the non-instrumented physical object comprises at least one of a block, a rod, a substantially planar object, or a grasping tool having grasping functionality.

4. The method according to claim 1, wherein:
the non-instrumented physical object is a first non-instrumented physical object and the movement information is first movement information, and
the method further comprises, by the processing device:
updating position and orientation information associated with the virtual object based on the virtual movement;
obtaining third image information of a second non-instrumented physical object manipulated by at least one of the user or another user, the third image information including second movement information, the second non-instrumented physical object being different from the first non-instrumented physical object; and
altering a shape of the virtual object based on the second movement information and the updated position and orientation information.

5. The method according to claim 1, wherein:
the non-instrumented physical object is a first non-instrumented physical object, the movement information is first movement information, and the virtual object is a first virtual object, and
the method further comprises, by the processing device:
obtaining third image information of a second non-instrumented physical object manipulated by at least one of the user or another user, the second image information including second movement information, the second non-instrumented physical object being different from the first non-instrumented physical object;
causing virtual movement of a second virtual object based on the second movement information;
detecting a first relative virtual spatial relationship between the first virtual object and the second virtual object, the first relative virtual spatial relationship satisfying a stored constraint; and
in response to detecting the first relative visual spatial relationship, causing virtual movement of the first virtual object or the second virtual object into a second relative virtual spatial relationship associated with the stored constraint.

6. The method according to claim 1, further comprising, by the processing device:
determining a geometric parameter of the non-instrumented physical object based at least in part on the second image information;

altering a shape of the virtual object based at least in part on the determined geometric parameter; and determining a virtual dimension corresponding to the altered shape of the virtual object.

7. The method according to claim 1, wherein the recognizing the non-instrumented physical object as the proxy comprises:

identifying, based at least partly on the first image information, a geometry of the non-instrumented physical object;

accessing a database comprising geometry information; and identifying that the geometry of the non-instrumented physical object matches geometry information in the database.

8. The method according to claim 1, wherein the movement information is first movement information and the at least one movement is a first movement, the method further comprising:

obtaining, by the processing device, third image information of the environment comprising the non-instrumented physical object;

identifying, by the processing device, that the third image information depicts the non-instrumented physical object resting on a surface;

in response to identifying that the third image information depicts the non-instrumented physical object resting on the surface, disengaging, by the processing device, the non-instrumented physical object as the proxy; and in response to disengaging the non-instrumented physical object as the proxy:

obtaining, by the processing device, fourth image information of the environment comprising the non-instrumented physical object, the fourth image information comprising second movement information indicating a second movement of the non-instrumented physical object; and refraining from causing further virtual movement of the virtual object based on the second movement information.

9. A method of shaping a virtual object in a three-dimensional image file, the method comprising:

obtaining, by a processing device, first image information of an environment comprising a non-instrumented physical object held and manipulated by a user;

identifying, by the processing device, a gesture in the first image information;

in response to identifying the gesture, recognizing, by the processing device, the non-instrumented physical object as a proxy;

in response to recognizing the non-instrumented physical object as the proxy, obtaining, by the processing device, second image information including movement information; and determining, by the processing device, a shape of the virtual object based on the movement information;

wherein the non-instrumented physical object omits fiducials, transponders, or other features specifically configured for detection by or communication with a computerized system.

10. The method according to claim 9, wherein:

the movement information indicates a path of the non-instrumented physical object through the environment; and the shape of the virtual object is determined to have a volume corresponding to the path.

11. The method according to claim 10, wherein a cross-section of the shape expands along the path of the non-instrumented physical object through the environment.

12. The method according to claim 11, further comprising, by the processing device:

obtaining an additional input contemporaneous with the obtaining of the movement information; and varying the cross-section of the shape at a location along the path corresponding in time to the additional input.

13. The method according to claim 10, wherein the shape is determined to have a uniform cross-section along the path of the non-instrumented physical object through the environment.

14. The method according to claim 9, wherein the determining the shape of the virtual object comprises altering, by the processing device, an existing shape of the virtual object.

15. The method according to claim 14, further comprising accessing, by the processing device, a predetermined set of alteration capabilities associated with the non-instrumented physical object manipulated by the user.

16. The method according to claim 15, wherein:

the predetermined set of alteration capabilities corresponds to subtracting virtual material from the virtual object to alter the shape of the virtual object; and the determining the shape includes adjusting boundary data of the virtual object to remove a portion of the virtual object based at least in part on the movement information.

17. The method according to claim 16, wherein:

the movement information includes information of a slicing motion of the non-instrumented physical object; and the determining the shape includes determining the portion of the virtual object to be removed based at least in part on a virtual trajectory of the slicing motion with respect to a virtual location of the virtual object.

18. The method according to claim 15, wherein:

the predetermined set of alteration capabilities corresponds to locally deforming or stretching the virtual object to alter the shape of the virtual object; and the determining the shape includes adjusting boundary data of the virtual object to deform the virtual object based at least in part on the movement information.

19. A method of modifying a virtual object in a three-dimensional image file, the method comprising, by a processing device:

obtaining first image information of an environment comprising a non-instrumented physical object held and manipulated by a user;

identifying, by the processing device, a gesture in the first image information;

in response to identifying the gesture, recognizing, by the processing device, the non-instrumented physical object as a proxy;

in response to recognizing the non-instrumented physical object as the proxy, obtaining, by the processing device, second image information including movement information; and altering a virtual surface appearance of at least a part of the virtual object based on the movement information;

wherein the non-instrumented physical object omits fiducials, transponders, or other features specifically configured for detection by or communication with a computerized system.

20. The method according to claim 19, wherein the altering the virtual surface appearance comprises at least one of:
- altering, by the processing device, a color of the virtual object; or
- altering, by the processing device, a texture of the virtual object.

* * * * *